(12) United States Patent
Capalik et al.

(10) Patent No.: US 8,789,189 B2
(45) Date of Patent: Jul. 22, 2014

(54) SYSTEM AND METHOD FOR SAMPLING FORENSIC DATA OF UNAUTHORIZED ACTIVITIES USING EXECUTABILITY STATES

(75) Inventors: Alen Capalik, Pacific Palisades, CA (US); David Andrews, Los Angeles, CA (US); Zachery Salwasser, Cambridge, MA (US)

(73) Assignee: NeuralIQ, Inc., Santa Monica, CA (US)

( * ) Notice: Subject to any disclaimer, the term of this patent is extended or adjusted under 35 U.S.C. 154(b) by 440 days.

(21) Appl. No.: 13/163,578

(22) Filed: Jun. 17, 2011

(65) Prior Publication Data
US 2011/0321165 A1 Dec. 29, 2011

Related U.S. Application Data

(60) Provisional application No. 61/358,363, filed on Jun. 24, 2010, provisional application No. 61/358,367, filed on Jun. 24, 2010.

(51) Int. Cl.
*G06F 11/00* (2006.01)

(52) U.S. Cl.
USPC ...... 726/25; 726/22; 726/26; 718/1; 718/100; 709/223; 709/224

(58) Field of Classification Search
USPC ........ 713/200, 201, 100, 164; 726/24, 22, 25, 726/26; 718/1, 100; 709/223, 224
See application file for complete search history.

(56) References Cited

U.S. PATENT DOCUMENTS

| | | | |
|---|---|---|---|
| 5,339,426 A | 8/1994 | Aoshima | |
| 5,621,886 A * | 4/1997 | Alpert et al. | 714/38.13 |
| 5,664,159 A * | 9/1997 | Richter et al. | 703/23 |
| 5,740,413 A * | 4/1998 | Alpert et al. | 712/227 |
| 6,009,274 A | 12/1999 | Fletcher et al. | |
| 6,279,113 B1 | 8/2001 | Vaidya | |
| 6,343,280 B2 * | 1/2002 | Clark | 705/55 |

(Continued)

FOREIGN PATENT DOCUMENTS

| | | |
|---|---|---|
| JP | 2005-316779 | 11/2005 |
| WO | WO 2006/113781 A1 | 10/2006 |
| WO | WO 2007/027739 | 3/2007 |

OTHER PUBLICATIONS

NeuralIQ, Office Action, CA 2,689,126, Aug. 15, 2012, 3 pgs.

(Continued)

*Primary Examiner* — Thu Ha Nguyen
(74) *Attorney, Agent, or Firm* — Morgan, Lewis & Bockius LLP

(57) ABSTRACT

A method includes receiving a list of target addresses, locating a first page table entry corresponding to the first page, and determining the first executability state. When the first executability state is non-executable, a first set of one or more target addresses that correspond to the first page, and a second set of one or more target addresses that correspond to one or more pages other than the first page are identified. One or more target addresses are stored in breakpoint registers of the computer system. The first executability state of the first page table entry is set as executable, and the executability states of page table entries that correspond to the second set of target addresses are set as non-executable. When the first address matches one of the target addresses stored in the breakpoint registers, forensic data is recorded.

20 Claims, 20 Drawing Sheets

(56) References Cited

U.S. PATENT DOCUMENTS

| | | | |
|---|---|---|---|
| 6,360,327 B1 | 3/2002 | Hobson | |
| 6,446,062 B1* | 9/2002 | Levine et al. | 707/690 |
| 7,222,366 B2 | 5/2007 | Bruton, III et al. | |
| 7,370,210 B2* | 5/2008 | Symes | 713/189 |
| 7,392,543 B2 | 6/2008 | Szor | |
| 7,464,407 B2 | 12/2008 | Nakae et al. | |
| 7,849,310 B2* | 12/2010 | Watt et al. | 713/164 |
| 7,949,866 B2* | 5/2011 | Watt et al. | 713/100 |
| 7,996,836 B1* | 8/2011 | McCorkendale et al. | 718/1 |
| 8,225,317 B1* | 7/2012 | Chiueh et al. | 718/1 |
| 8,397,242 B1* | 3/2013 | Conover | 719/313 |
| 8,539,582 B1 | 9/2013 | Aziz et al. | |
| 8,639,625 B1* | 1/2014 | Ginter et al. | 705/51 |
| 2001/0011254 A1* | 8/2001 | Clark | 705/59 |
| 2002/0099752 A1 | 7/2002 | Markos et al. | |
| 2002/0166063 A1 | 11/2002 | Lachman, III et al. | |
| 2002/0194437 A1* | 12/2002 | Kapoor et al. | 711/153 |
| 2003/0120935 A1 | 6/2003 | Teal et al. | |
| 2004/0025052 A1 | 2/2004 | Dickenson | |
| 2004/0034794 A1* | 2/2004 | Mayer et al. | 713/200 |
| 2004/0153672 A1* | 8/2004 | Watt et al. | 713/201 |
| 2004/0177269 A1* | 9/2004 | Belnet et al. | 713/200 |
| 2004/0225877 A1 | 11/2004 | Huang | |
| 2005/0229250 A1 | 10/2005 | Ring et al. | |
| 2006/0018466 A1 | 1/2006 | Adelstein et al. | |
| 2006/0031673 A1 | 2/2006 | Beck et al. | |
| 2006/0136720 A1 | 6/2006 | Armstrong et al. | |
| 2006/0242703 A1 | 10/2006 | Abeni | |
| 2006/0288414 A1 | 12/2006 | Kuroda | |
| 2006/0294592 A1 | 12/2006 | Polyakov et al. | |
| 2007/0002689 A1 | 1/2007 | Mateescu et al. | |
| 2007/0101431 A1 | 5/2007 | Clift et al. | |
| 2007/0180450 A1 | 8/2007 | Croft et al. | |
| 2007/0180529 A1 | 8/2007 | Costea et al. | |
| 2007/0240221 A1* | 10/2007 | Tuvell et al. | 726/24 |
| 2007/0250930 A1 | 10/2007 | Aziz et al. | |
| 2008/0005782 A1 | 1/2008 | Aziz | |
| 2008/0127114 A1* | 5/2008 | Vasudevan | 717/129 |
| 2008/0177994 A1 | 7/2008 | Mayer | |
| 2008/0320594 A1 | 12/2008 | Jiang | |
| 2009/0307273 A1 | 12/2009 | Johnson et al. | |
| 2010/0042632 A1 | 2/2010 | Johnson et al. | |
| 2010/0095281 A1* | 4/2010 | Raber | 717/129 |
| 2011/0179136 A1 | 7/2011 | Twitchell, Jr. | |
| 2011/0239291 A1 | 9/2011 | Sotka | |
| 2011/0321165 A1* | 12/2011 | Capalik et al. | 726/25 |
| 2012/0174186 A1 | 7/2012 | Aziz et al. | |
| 2012/0179904 A1 | 7/2012 | Dunn et al. | |
| 2012/0331553 A1 | 12/2012 | Aziz et al. | |
| 2013/0340077 A1* | 12/2013 | Salsamendi et al. | 726/23 |

OTHER PUBLICATIONS

Capalik, Office Action, U.S. Appl. No. 13/759,335, Jun. 14, 2013, 32 pgs.

NeuralIQ Inc., Notice of Reasons for Rejection, JP 2010-504185, Mar. 15, 2013, 4 pgs.

Asrigo et al., "Using VMM-Based Sensors to Monitor Honeypots," Department of Electrical and Computer Engineering, VEE'06, Jun. 14-16, 2006, pp. 13-23.

Debug Register, "Aus Lowlevel," Mar. 22, 2010, 5 pgs.

Joshi et al., "Detecting Past and Present Intrusions Through Vulnerability-Specific Predicates," Department of Electrical Engineering and Computer Science, SOSP'05, Oct. 23-26, 2005, 14 pgs.

Krapf et al., "XEN Memory Management (Intel IA-32)," Oct. 30, 2007, 6 pgs.

Litty et al., "Hypervisor Support for Identifying Covertly Executing Binaries," SS'08 Proceedings of the 17th Conference on Security Symposium, Dec. 31, 2008, 1-16 pgs.

Provos, "A Virtual Honeypot Framework," Oct. 21, 2003, 11pgs.

Neuraliq, Inc., PCT/US2011/041122, Jun. 20, 2011, International Search Report and Written Opinion mailed Sep. 21, 2011, 14 pgs.

Neuraliq, Inc., PCT/US2011/041119, Jun. 20, 2011, International Search Report and Written Opinion mailed Oct. 4, 2011, 14 pgs.

European Network of Affined Honeypots, "D1.2 Attack Detection and Signature Generation," May 11, 2006, 79 pgs.

Shibuya et al., "A Study for Some Experiences of the Operation of Highly Interactive Decoy System," Information Processing Society of Japan, vol. 45, No. 8, Aug. 2004, 34 pgs.

Honeypot (computing)—Wikipedia, the free encyclopedia, downloaded Jul. 17, 2006, 4 pgs., http://en.wikipedia.or/wiki/Honeypot_(computing).

Intrusion-detection system—Wikipedia, the free encyclopedia, downloaded Jul. 17, 2006, 3 pgs., http://en.wikipedia.or/wiki/Intrusion_detection_system.

International Search Report and Written Opinion for PCT/US08/60336 dated Aug. 11, 2008, 9 pgs.

Office Action for U.S. Appl. No. 11/488,743 dated Jul. 30, 2009, 21 pgs.

Office Action for U.S. Appl. No. 11/488,743 dated Feb. 16, 2010, 23 pgs.

Office Action for U.S. Appl. No. 11/488,743 dated Aug. 4, 2010, 21 pgs.

Office Action for U.S. Appl. No. 11/488,743 dated Jan. 18, 2011, 23 pgs.

Office Action for U.S. Appl. No. 11/488,795 dated Jun. 9, 2010, 13 pgs.

Office Action for U.S. Appl. No. 11/488,795 dated Dec. 1, 2010, 18 pgs.

Examiner's Answer for U.S. Appl. No. 11/488,795 dated May 31, 2011, 19 pgs.

Capalik, Notice of Allowance, U.S. Appl. No. 11/488,743, Oct. 24, 2012, 15 pgs.

Liang, Fast and Automated Generation of Attack Signatures: A Basis for Building Self-Protecting Servers, Nov. 7-11, 2005.

NeuralIQ, Office Action, Australian Patent Application No. 2008242296, Apr. 5, 2012, 2 pgs.

Capalik, Notice of Allowance, U.S. Appl. No. 13/759,335, Oct. 9, 2013, 10 pgs.

NeuralIQ Inc., Decision to Grant a Patent, JP 2010-504185, Jul. 26, 2013, 1 pg.

Capalik, Office Action, U.S. Appl. No. 13/163,590, Oct. 25, 2013, 11 pgs.

* cited by examiner

SYSTEM AND METHOD FOR SAMPLING FORENSIC DATA OF UNAUTHORIZED ACTIVITIES USING EXECUTABILITY STATES

RELATED APPLICATIONS

This application claims priority to U.S. Provisional Application Ser. No. 61/358,363 filed on Jun. 24, 2010, entitled "System and Method for Sampling Forensic Data of Unauthorized Activities Using Executability States," which is incorporated by reference herein.

This relates to U.S. patent application Ser. No. 13/163,590, entitled "System and Method for Identifying Unauthorized Activities on a Computer System Using a Data Structure Model" filed concurrently herewith, which claims priority to U.S. Provisional Application Ser. No. 61/358, 367, entitled "System and Method for Identifying Unauthorized Activities on a Computer System Using a Data Structure Model" filed on Jun. 24, 2010, both of which are incorporated by reference herein.

This relates to U.S. patent application Ser. No. 11/788,795, entitled "System and Method for Analyzing Unauthorized Intrusion into a Computer Network," filed on Apr. 20, 2007, which is a continuation-in-part of U.S. patent application Ser. No. 11/488,743, entitled "Decoy Network Technology With Automatic Signature Generation for Intrusion Detection and Intrusion Prevention Systems," filed on Jul. 17, 2006, both of which are incorporated herein by reference in their entireties.

TECHNICAL FIELD

The following relates generally to the field of systems and methods for protecting computer networks, including but not limited to analyzing data of malicious activities for use in protecting computer networks.

BACKGROUND

An increasing number of computers are connected to computer networks (e.g., the Internet). Networked computers provide a significant benefit of accessing and sharing data over the networks. However, networked computers are also vulnerable to attacks, unwanted intrusions, and unauthorized accesses from over the network.

Network security systems have been developed to protect computers from attacks, unwanted intrusions, unauthorized accesses, and other malicious activities. Such network security systems include firewalls to prevent unauthorized access to the network or its computers. Exemplary network security systems may also include intrusion detection systems (IDS) and intrusion prevention systems (IPS) that typically contain a library of malware fingerprints (e.g., fingerprints of malware payloads and other unauthorized activities). By using the malware fingerprints, the IDS or the IPS can detect attempts to access computer systems without authorization (e.g., check for malicious activities). When a connection is attempted to a network port, the IDS or IPS examines the low-level IP data packets and compares them to its library of fingerprints for a match. When a match is identified, the IDS or IPS provides notification of the match and/or prevents further malicious activities. As such, the malware fingerprints play a critical role in network security.

A critical threat to computer networks is the so-called zero-day attack that exploits security vulnerabilities previously unknown to software developers or system operators. Because the security vulnerabilities are unknown to the software developers or system operators, existing fingerprints are useless and fingerprints of the specific zero-day attack is unavailable. Until the fingerprints are identified, attacks exploiting the same security vulnerabilities continue without detection by the network security systems. However, identifying the fingerprints of malicious activities in the middle of numerous other non-malicious processes is not a trivial task.

Because network security systems depend on the above described malware fingerprints, there is a great need for efficient methods of identifying fingerprint data for previously unknown types of malicious and/or unauthorized activities.

SUMMARY

A number of embodiments that address the limitations and disadvantages described above are presented in more detail below. Some embodiments described herein provide computer-implemented methods and systems for recording forensic data for zero-day unauthorized activities. Some embodiments described herein provide methods and systems for hypervisor-based continuous monitoring of one or more virtualized operating systems.

As described in more detail below, some embodiments involve a computer-implemented method performed at a computer system having one or more processors and memory storing one or more programs for execution by the one or more processors. The method includes locating a list of target addresses. While executing at least one of the one or more programs, the following operations are performed. In response to detecting a request to execute an instruction located at a first address of a first page, a first page table entry corresponding to the first page is located. The first page table entry has a first executability state, and the first executability state is determined. When the first executability state is non-executable, a first set of one or more target addresses that correspond to the first page is identified, and a second set of one or more target addresses that correspond to one or more pages other than the first page is identified. One or more target addresses of the first set of target addresses are stored in breakpoint registers of the computer system. Each breakpoint register is configured to store an address of a respective breakpoint in the memory. The first executability state of the first page table entry is set as executable, and the executability states of page table entries that correspond to the second set of target addresses are set as non-executable. When the first address corresponds to one of the target addresses stored in the breakpoint registers, forensic data associated with the request to execute an instruction located at the first address is recorded.

In accordance with some embodiments, a computer-implemented method is performed at a computer system having one or more processors and memory storing one or more programs for execution by the one or more processors. The method includes running one or more virtual machines and at least one virtual machine monitor. At the virtual machine monitor, a first virtual memory address used in one of the one or more virtual machines is received. A first page corresponding to the first virtual memory address and a first page table entry corresponding to the first page are identified. The first page table entry is associated with the virtual machine monitor. The executability state of the first page table entry is set as non-executable. In response to detecting a request to execute an instruction located at a second virtual memory address that corresponds to the first page table entry, forensic data associated with the request to execute the instruction located at the second virtual memory address is recorded.

In accordance with some embodiments, a system includes one or more processors, memory. The memory stores one or more programs. The one or more programs are configured for execution by the one or more processors. The one or more programs include instructions for performing any of the methods described above.

In accordance with some embodiments, a computer readable storage medium stores one or more programs configured for execution by one or more processors of a computer. The one or more programs include instructions for performing any of the methods described above.

By analyzing recorded forensic data, fingerprint data indicative of unauthorized activities on the computer system is generated. Because the forensic data is recorded without relying on fingerprint data, the forensic data can provide information about zero-day attacks.

Although some of the embodiments are described herein with respect to security applications, it should be noted that analogous methods and systems may be used for monitoring computer systems in general.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Methods and systems for monitoring computer systems are described below. Reference will be made to certain embodiments of the invention, examples of which are illustrated in the accompanying drawings. While the invention will be described in conjunction with the embodiments, it should be understood that these particular embodiments are not intended to limit the invention. Instead, the invention is intended to cover alternatives, modifications and equivalents that are within the spirit and scope of the invention as defined by the appended claims. Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Figure 1:
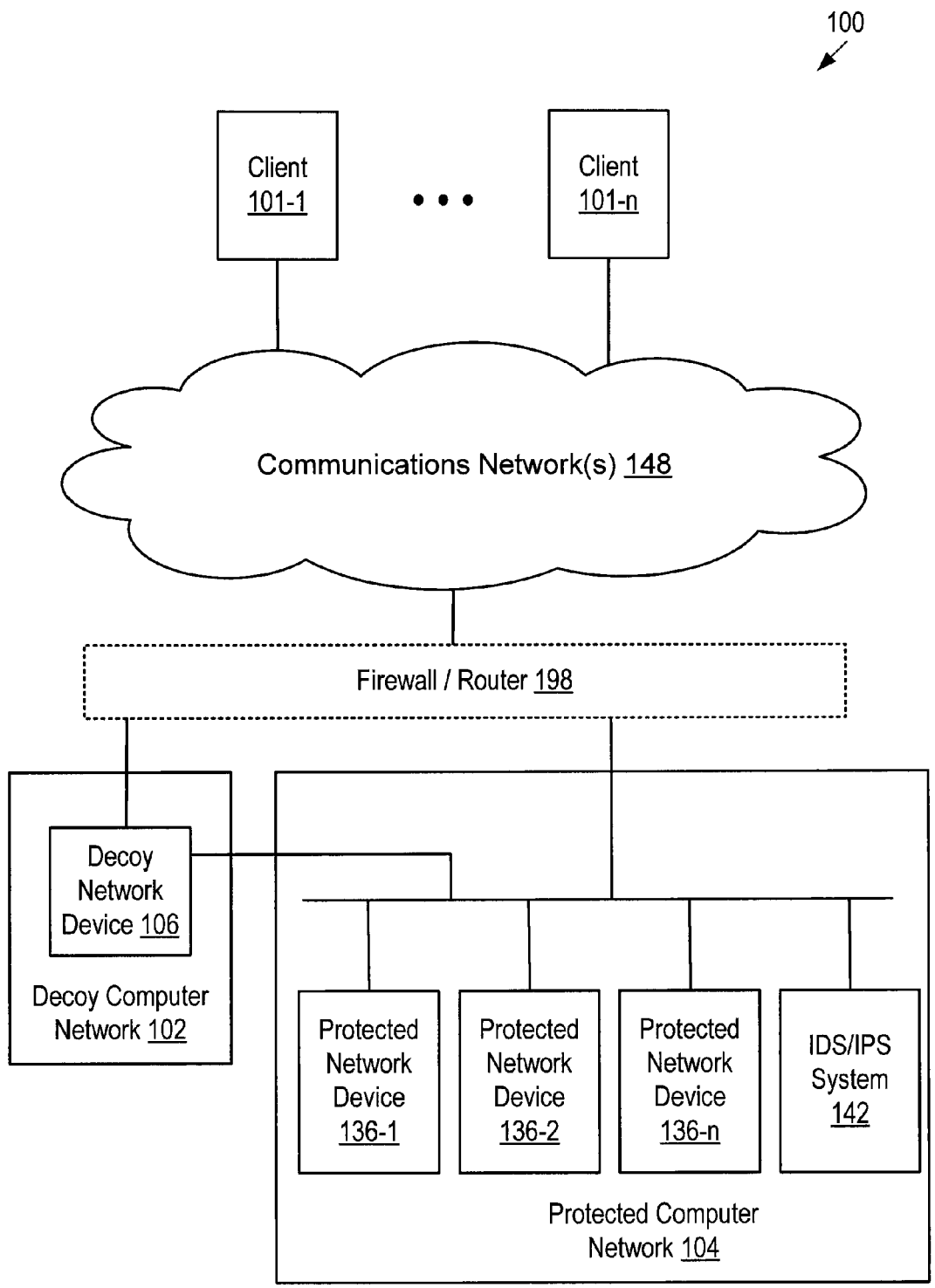
FIG. 1 is a high-level block diagram illustrating an exemplary distributed computer system in accordance with some embodiments.

FIG. 1 illustrates an exemplary distributed computer system 100, according to some embodiments. The system 100 includes a decoy computer network 102, a communications network 148, and protected computer network 104. Various embodiments of the decoy computer network 102 and protected computer network 104 implement the unauthorized activity identifying methods described below.

In some embodiments, the systems on the decoy computer network 102 and the protected computer network 104 can be accessed by client computers 101. The client computers 101 can be any of a number of computing devices (e.g., Internet kiosk, personal digital assistant, cell phone, gaming device, desktop computer, laptop computer, handheld computer, or combinations thereof) used to enable the activities described below. The client computers 101 are also referred to herein as clients. The clients 101 are connected to a decoy network device 106 and a protected network device 136 (e.g., 136-1, 136-2, and 136-n) via the communications network 148.

The protected network devices 136 are accessible from the network 148 by one or more authorized users using one or more of the clients 101 (e.g., the protected network devices can be servers providing services for webpages, emails, file downloading and sharing, web applications, etc.). Typically, the protected computer network 104 includes a firewall/router 198 to protect the protected network devices 136 and route network traffic to and from the protected network devices 136. Alternatively, the firewall/router 198 can protect both the decoy computer network 102 and the protected computer network 104, as illustrated in FIG. 1.

In some embodiments, the protected computer network 104 also includes an IDS/IPS system 142 (intrusion detection and prevention system). The IDS/IPS system 142 includes, or has access to, a fingerprint library (not shown in FIG. 1). The fingerprint library includes fingerprints of unauthorized activities. The IDS/IPS system 142 identifies unauthorized activities based on the fingerprints stored in the fingerprint library, and provides notification to a user or a system administrator, and/or prevents unauthorized activities by modifying the protected network devices 136 and/or the firewall/router 198. Hardware for suitable IDS/IPS systems 142 include Cisco Systems' IPS 4200 Series, Juniper's IDP 200, and Enterasys' Dragon IDS Network Sensor.

As explained above, in some embodiments, the IDS/IPS system 142 is coupled to the firewall/router 198 such that the IDS/IPS system can reconfigure the firewall/router 198 to protect the protected network devices 136 in the protected computer network 104 from future attacks. In some embodiments, the IDS/IPS and the firewall are located in a single combined device.

The decoy computer network 102 includes at least one decoy network device 106. The decoy network device 106 is a decoy system that is used to attract and monitor unauthorized activities. In some embodiments, the decoy network device 106 is intentionally kept vulnerable to unauthorized or malicious activities (e.g., known security weaknesses may be intentionally left unfixed or other security components (e.g., firewalls) are intentionally not installed). In other embodiments, the decoy network device 106 includes the same security devices and software applications of other protected network devices (e.g., the decoy network device 106 may be protected by the firewall/router 198 and any other security measures included in the protected network devices 136). The purpose of the decoy network device 106 is to monitor unauthorized activities occurring on the decoy network device 106 during an attack on the decoy network device 106. In some embodiments, the pattern of the attack is monitored and analyzed to generate a fingerprint. This fingerprint of the attack can be used to prevent similar attacks on the decoy network device 106 and/or other computers (e.g., protected network devices 136).

Attackers can initiate attacker activities over the communications network(s) 148 directed at both the decoy computer network 102 and the protected computer network 104. Ideally, the firewall/router 198 or security software on the protected network devices 136 will prevent unauthorized access to the protected network devices 136, whereas the decoy network device 106 is typically exposed to the attacker activity(s) in order to attract the attacks.

Although FIG. 1 illustrates the decoy computer network 102 and the protected computer network 104 as separate networks, in some embodiments, they are part of a same network.

Figure 2:
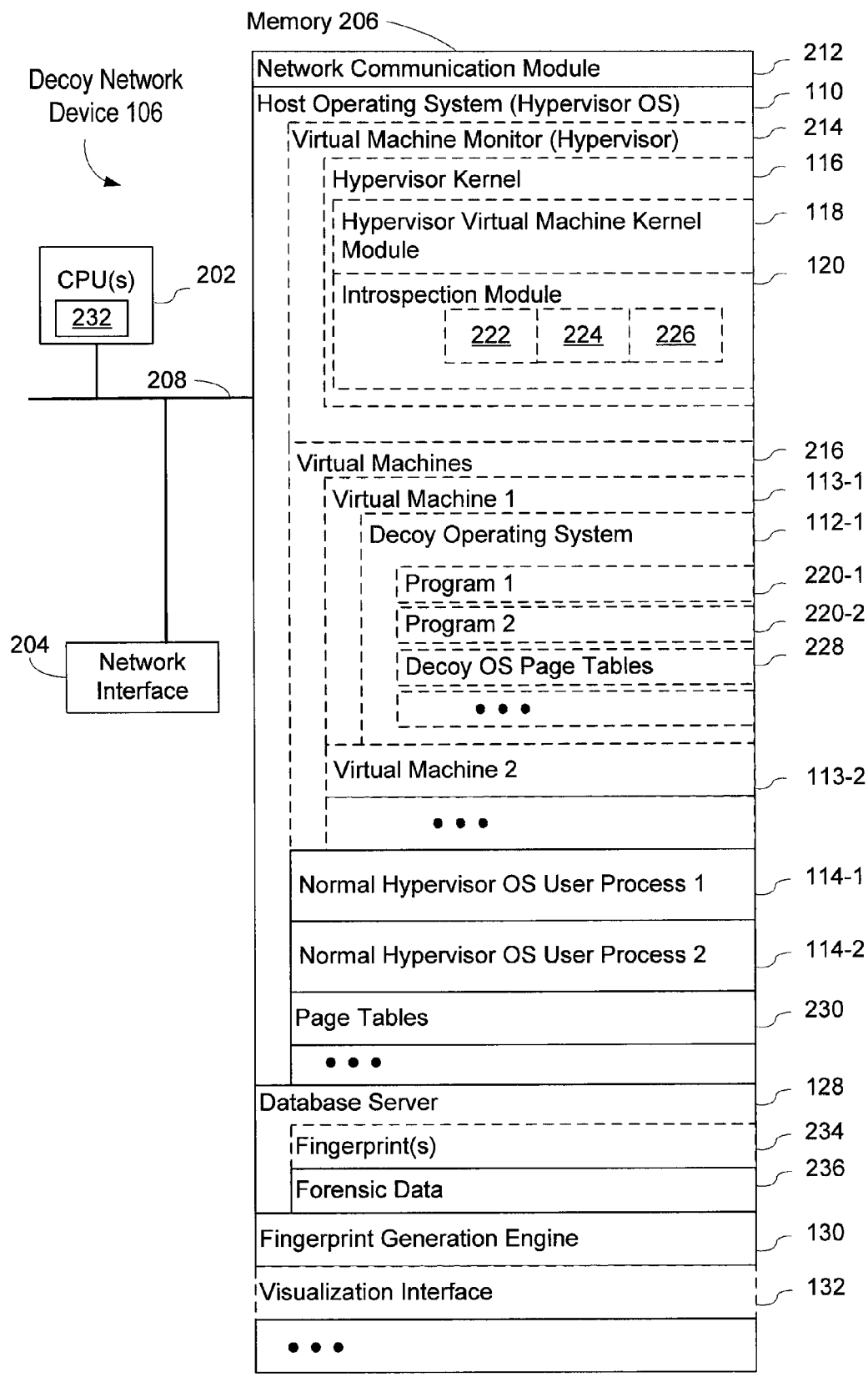
FIG. 2 is a block diagram illustrating a decoy network system, in accordance with some embodiments.

FIG. 2 is a block diagram illustrating the decoy network device 106 in accordance with some embodiments. The decoy network device 106 typically includes one or more processing units (CPUs) 202, one or more network or other communications interfaces 204, memory 206, and one or more communication buses 208 for interconnecting these components. In some embodiments, the communication buses 208 include circuitry (sometimes called a chipset) that interconnects and controls communications between system components. In some other embodiments, the decoy network device 106 includes a user interface (not shown) (e.g., a user interface having a display device, a keyboard, and a mouse or other pointing device), but when implemented as a server, the decoy network device 106 is more typically controlled from and accessed by various client systems (e.g., the client 101 in FIG. 1; and more typically, a client connected through a secure private network or within the same protected computer network 104).

The CPU(s) 202 includes one or more breakpoint registers 232. Breakpoint registers store one or more addresses in the memory 206. In response to a request or attempt to execute an instruction (as indicated by one or more program counters in the CPU(s) 202) located at an address corresponding to an address stored in the one or more breakpoint registers 232 (also called breakpoints, such as breakpoints 414 in FIGS. 4A-4H), the CPU(s) 202 generates an interrupt (also called herein an exception or fault). Such interrupt can be used to trigger an execution of code (e.g., debug handling code, memory dump, memory scan, etc.). In some embodiments, the breakpoint registers 232 are located in the chipset (e.g., the chipset in the communication buses 208). Alternatively, the breakpoint registers 232 can be located in any other part of the decoy network device 106. In some embodiments, the one or more breakpoint registers 232 include debug registers 410 (shown in FIGS. 4A-4H).

The memory 206 of the decoy network device 106 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, or alternately the non-volatile memory device(s) within the memory 206, comprises a computer readable storage medium. The memory 206 or the computer readable storage medium of the memory 206 stores one or more of the following programs:

the network communication module (or instructions) 212 that is used for connecting the decoy network device 106 to computer networks (e.g., communication network(s) 148, decoy computer network 102, and protected computer network 104), and/or other computers (e.g., the client 101 and/or other protected network devices 136) via the one or more communications interfaces 204 and one or more communications networks 148, such as the Internet, a wireless network (e.g., Wi-Fi, WiMAX, 3G, 4G, etc.), any local area network (LAN), wide area network (WAN), metropolitan area network, or a combination of such networks;

the host operating system 110 (also called Hypervisor OS) that includes procedures for handling various basic system services and for performing hardware dependent tasks;

database server 128, which stores data (e.g., the fingerprint(s) 234 and/or forensic data 236);

fingerprint generation engine 130, which generates the fingerprint data 234 from the decoy network device 106); and visualization interface 132, which prepares data (e.g., the fingerprint or unauthorized activities on the computer system) for display (e.g., on a GUI of a client 101).

The fingerprint(s) 234 includes data indicative of unauthorized activities on the decoy network device 106. In some embodiments, the fingerprint 234 includes one or more of: system calls, arguments of system calls, returns of system calls, device and memory input-output, driver information, library calls, branching information, instruction pointer jumps, and raw network information collected from a respective virtual machine 113 or a respective decoy operating system 112 (also called a guest operating system). Such fingerprint(s) 234 can be used (e.g., by the IDS/IPS system 142) to detect and prevent unauthorized activities on protected network devices 136. For example, the fingerprint(s) 234 can be used to prevent future attacks on the computer system and/or other computer systems (e.g., the protected network devices 136) by, for example, increasing privileges for targeted instructions and/or files, changing the file/instruction name, changing the file/instruction structure, moving files/instructions to different locations, blocking a particular port, encrypting files, etc.

The forensic data 236 records a log of activity on the decoy network device 106 and/or virtual machines 216 described below. The forensic data 236 may also include one or more fingerprint(s) 234.

In some embodiments, the host operating system (e.g., the host OS 110) includes one or more of the following:

a virtual machine monitor 214 (also called a hypervisor);

virtual machines 216, including virtual machine 1 (113-1) and (optional) virtual machine 2 (113-2);

normal hypervisor OS user processes (e.g., 114-1 and 114-2); and page tables 230, which are used to translate a virtual memory address used by the host operating system 110 to a physical memory address. The page tables 230 are described in detail with reference to FIGS. 3A-3C and 5A-5B.

The virtual machine monitor 214 includes a hypervisor kernel 116 that resides in physical memory and provides the basic services to the virtual machine monitor 214. In some embodiments, the hypervisor kernel 116 is part of the hypervisor operating system 110 (e.g., a kernel of the hypervisor operating system 110). In such embodiments, the hypervisor kernel 116 is a part of the operating system that activates the hardware directly or interfaces with another software layer that, in turn, drives the hardware.

The hypervisor kernel 116 includes a hypervisor virtual machine kernel module 118 that supports virtualization of a "guest" decoy operating system 112. The hypervisor kernel 116 also includes an introspection module 120 interposed between the virtual machine monitor 214 and decoy operating system(s) 112. The introspection module 120 performs introspection (e.g., monitoring) into the physical memory segments assigned to each of the virtualized decoy operating system 112. Because no software is installed in the virtualized decoy operating system 112, it is more difficult for the virtualized decoy operating system 112 (or an attacker who has gained access to the virtualized decoy operating system 112) to detect that its memory is being monitored.

The introspection module is configured to examine the memory assigned to the virtualized decoy operating systems 112 in order to acquire low-level data about the interaction between the decoy operating systems 112 and any attack activity. The introspection module examines the memory of virtualized decoy operating systems 112 by means of three functional components: a code region selector 222, a trace instrumentor 224, and a trace analyzer 226. Regular expressions (also known as 'regex') are used throughout the process to identify, describe, and profile the contents of the memory segments of the virtualized decoy operating systems 112. The code selector 222 identifies regions of code in memory that are of interest for further introspection. Regions of interest may include, but are not limited to, system calls, the arguments of system calls, the returns of system calls, device and memory input-output, driver information, library calls, branching information, instruction pointer jumps, and raw network information. The instrumentor 224 copies the memory traces of interest identified by the code selector and then profiles them. The trace analyzer 226 takes the profiled traces and uses them to build a simulation of the states in the virtualized decoy operating system 112 over time. In this manner, the introspection module examines the contents of the memory segments of the virtualized decoy operating systems 112 in an instrumented context that generates and retrieves forensic data (or fingerprints). In some embodiments, the trace analyzer 226 is located outside the introspection module 120 (e.g., in the fingerprint generation engine 130).

In some embodiments, the introspection module 120 is configured to pause the execution of the virtualized decoy operating system 112, copy the content of memory at prescribed locations, and return execution control to the virtualized decoy operating system 112. In some embodiments, the introspection module 120 pauses the execution of the virtualized decoy operating system 112 for preventing malicious or undesired execution from occurring in the virtualized decoy operating system 112.

An attacker may be able to detect that the decoy operating system 112 is a virtualized operating system, based on the time it takes to perform standardized tasks. However, since the introspection module 120 runs completely outside the virtualized decoy operating system 112, it is difficult for an attacker accessing the decoy operating system 112 to determine whether the decoy operating system 112 is being monitored. In other words, the attacker may suspect that the virtual machine monitor 214 exists, but the attacker may not determine whether the virtual machine monitor 214 includes the introspection module 120. As explained above, the introspection module 120 monitors and introspects into the memory segments of the virtualized decoy operating systems 112. The introspection module 120 introspects and gathers information on any virtualized operating system supported by the hypervisor operating system 110.

The virtual machines 216 are one or more software applications emulating one or more physical machines (e.g., computer systems). In some embodiments, at least one virtual machine (e.g., the virtual machine 1 (113-1)) includes a decoy operating system 112-1, which in turn optionally includes one or more programs (e.g., 220-1 and 220-2). The decoy operating system 112-1 also includes decoy OS page tables 228, which are used to translate a guest virtual memory address used by the decoy operating system 112-1 to a guest physical memory address. The decoy OS page tables 228 are described in detail with reference to FIGS. 3A-3C and FIGS. 5A-5B. The virtualized decoy operating systems 112 access the physical memory assigned to them by the virtual machine monitor 214 (or the hypervisor kernel 116).

These virtualized operating systems 112 act as decoy operating systems to attract attacker activity. For example, the decoy operating systems 112 can be one of WINDOWS, SUN MICROSYSTEMS, SOLARIS, or any version of LINUX known to persons skilled in the art, as well as any combination of the aforementioned. The decoy network device 106 may include any number of virtualized decoy operating systems 112 or any number of virtual machines 113.

Each of the above identified modules, components, and applications in FIG. 2 corresponds to a set of instructions for performing one or more functions described herein. These modules (i.e., sets of instructions) need not be implemented as separate software programs, procedures or modules, and thus various subsets of these modules may be combined or otherwise re-arranged in various embodiments. In some embodiments, the memory 206 may store a subset of the modules and data structures identified above. Furthermore, the memory 206 may store additional modules and data structures not described above.

Notwithstanding the discrete blocks in FIGS. 1 and 2, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, the fingerprint generation engine 130 and the virtualized decoy OS 112 are part of or stored within the decoy network device 106. In other embodiments, the fingerprint generation engine 130 and the virtualized decoy OS 112 are implemented using separate computer systems. In some embodiments, the fingerprint generation engine 130 includes the database server 128. In some embodiments, the database server 128 is a remote database server located outside the decoy network device 106.

The actual number of servers used to implement the decoy network device 106 and how features are allocated among them will vary from one implementation to another, and may depend in part on the amount of data traffic that the system must handle during peak usage periods as well as during average usage periods, and may also depend on the amount of data processed by the decoy network device 106. Moreover, one or more of the blocks in FIGS. 1 and 2 may be implemented on one or more servers designed to provide the described functionality. For example, the decoy network device 106 may be implemented on two distinct computing devices: a monitor device and an analyzer device. The monitor device includes the virtual machine monitor 214, the virtual machines 216, and processes and modules therein. The analyzer device includes the database server 128, the fingerprint generation engine 130, and optionally the visualization interface 132. In such configuration, the monitor device collects unauthorized activity data, and the analyzer device analyzes the unauthorized activity data to generate fingerprints. In some embodiments, the monitor device includes the introspection module comprising the code region selector 222, the trace instrumentor 224, and the trace analyzer 226 without including the virtual machine monitor 214 or virtual machines 216.

When in use, attackers typically search for vulnerable computers connected to the shared communication network(s), and attempt to perform unauthorized activities on such vulnerable computers through the shared communication network(s).

Attacker activity may be directed at the decoy computer network 102 through one or more ports of each of the virtualized decoy operating system 112 that are left open as a gateway for the attacker activity. For example, the decoy network 102 can be configured to respond to connection attempts made at network addresses that do not exist on the protected network 104 (e.g., through a connection from the firewall/router 198 to the decoy network device 106 as illustrated in FIG. 1). Connections to these non-existent network addresses are assumed to be unauthorized and routed to one of the decoy operating systems 112, since no production hardware (e.g., a protected network device 136) exists on the protected network 104 at these addresses. In particular, the decoy operating systems 112 are not configured to provide any user service (e.g., the decoy operating systems 112 may be configured to provide a dummy service), and therefore, no ordinary (i.e., authorized and/or non-malicious) user would attempt to access to the virtual machine.

The decoy operating systems 112 (in the form of a virtualized operating system) may be configured to respond to any such non-existent network address. In a typical attack, the attacker activity scans for an open port, ostensibly in an attempt to make a network connection and then access one or more computing devices on the protected computer network 104. When the attacker activity scans for open ports at non-existent network addresses, however, the attacker is presented with a virtualized decoy operating system 112 instead.

When the attacker connects to a virtualized decoy operating system 112 through an open port, the attacker sees a fully-functional standard operating system fingerprint. Since the decoy network device 106 can be configured to present any operating system as a fully-functional virtualized decoy operating system 112, responses to connection requests from attacker activity are guaranteed to be authentic for the operating system running on that decoy. For example, an FTP port access request for WINDOWS may return a specific character sequence that differs from an FTP response for LINUX. Similarly, an FTP access request to a WINDOWS port may return a response ">ftp: connect: Connection refused." This character sequence may be slightly different from that generated by LINUX. Further, different versions of WINDOWS may respond with slightly different, version-specific character sequences. Since attackers often use these sequences to identify what type of operating system is at a particular network address and the version (or range of possible versions) for that operating system, the fact that virtualized decoy operating systems 112 generate authentic responses makes them realistic decoys and encourages intruders to attempt unauthorized access to them. The instigator of the attack is thus lured into accessing the decoy 112, which is overseen by the hypervisor operating system 110 running on the hardware-based, decoy network device 106. Attacker activity may then initiate previously unknown attacks for the observed operating system. When the attacker activity proceeds to interact with the decoy operating system 112, the attacker provides the decoy operating system 112 with the data used to obtain control of the decoy operating system 112. These data are recorded and analyzed by the introspection module without the knowledge of the attacker.

All scans by the attacker activity receive real-world operating system and service information, leading the attacker to believe that there is a potentially vulnerable system responding. The attacker is thus lured into communicating with the decoy network device 106 and its virtualized decoy operating systems 112 and services. Since the decoy network device 106 includes real hardware, the attacker is essentially attacking an actual physical system and, therefore, cannot tell that the system is actually an instrumented honeypot that monitors the attacker activity from the introspection module. When an attacker connects to a network port and begins interacting with a virtualized decoy operating system 112, the introspection module monitors and captures information from the connection, including port numbers, data streams, file uploads, keystrokes, ASCII or binary files, malicious payloads, memory manipulation attempts, and any other data transfers or malicious activity.

In some embodiments, the introspection module monitors all activity on virtualized decoy operating systems 112. But more typically, the introspection module, instead of monitoring all activity on virtualized decoy operating systems 112, monitors activity on virtualized decoy operating system 112 based on predefined criteria, such as a monitoring priority. In some embodiments, certain regions of the memory or certain memory addresses are given priority for monitoring. Alternatively, the monitoring priority may be set based on the type of unauthorized activities. For example, in some embodiments, incoming network packets are given high priorities, and therefore, the incoming network packets are thoroughly monitored and analyzed. In some other embodiments, system calls are given high priorities. In yet other embodiments, a virtualized decoy operating system (e.g., 112-1) on a virtual machine 1 (e.g., 113-1) is given a high priority than other virtualized decoy operating system, when the virtual machine 1 is experiencing a high frequency of unauthorized activities. Also a combination of the factors stated above can be used to determine the monitoring priority.

In use, the introspection module captures (through the introspection) raw attack information. The raw attack information is then communicated to and stored on the database server 128 as forensic data 236 for later analysis. The fingerprint generation engine 130 or the trace analyzer 226 then uses this raw forensic information 236 to generate a signature of the attack. In some embodiments, the fingerprint generation engine 130 or the trace analyzer 226 uses the raw attack information to generate a signature of the attack without storing the raw attack information (i.e., unauthorized activity data) in a database server (e.g., database server 128) first. In some embodiments, the fingerprint generation engine 130 or the trace analyzer 226 uses the raw attack information to generate a signature of the attack without storing the raw attack information in persistent data storage (e.g., database server 128) at all.

In some embodiments, the entire process from attack detection through fingerprint generation occurs automatically, i.e., without any human intervention, at a timescale ranging from nearly immediate to several minutes. The IDS/IPS system 142 uses the forensic data 236 and/or attack signature to identify and prevent subsequent attacks.

In one or more embodiments, the forensic data 236 and/or signature (e.g., fingerprints 234) may be sent from the fingerprint generation engine 130 to the intrusion detection and/or prevention (IDS/IPS) signature library 134 through a second network connection 140, which is used by the fingerprint generation engine 130 to directly interact with the IDS/IPS system 142.

After collecting unauthorized activity data, the introspection module 120 may easily clean the virtualized decoy operating system 112 at any time by removing the running system image of the compromised virtualized decoy operating system and replacing it with a pre-attack system image. Thus the introspection module 120 can cleanse or reset the virtualized decoy operating system 112 of any malicious software or payload, removing the possibility that attacker(s) can use that virtualized decoy operating system 112 for further attacks on other networks. In this manner, the attack can be thwarted, and the operating system does not become a tool of the attacker(s). This procedure may also be automated, i.e., may occur without further human intervention.

In some embodiments, a protected network device 136 (FIG. 1) includes at least a subset of the components and/or modules described herein with respect to FIG. 2. For example, the protected network device 136 may include a hypervisor, page tables, and one or more virtual machines without a decoy operating system.

Figure 3A:
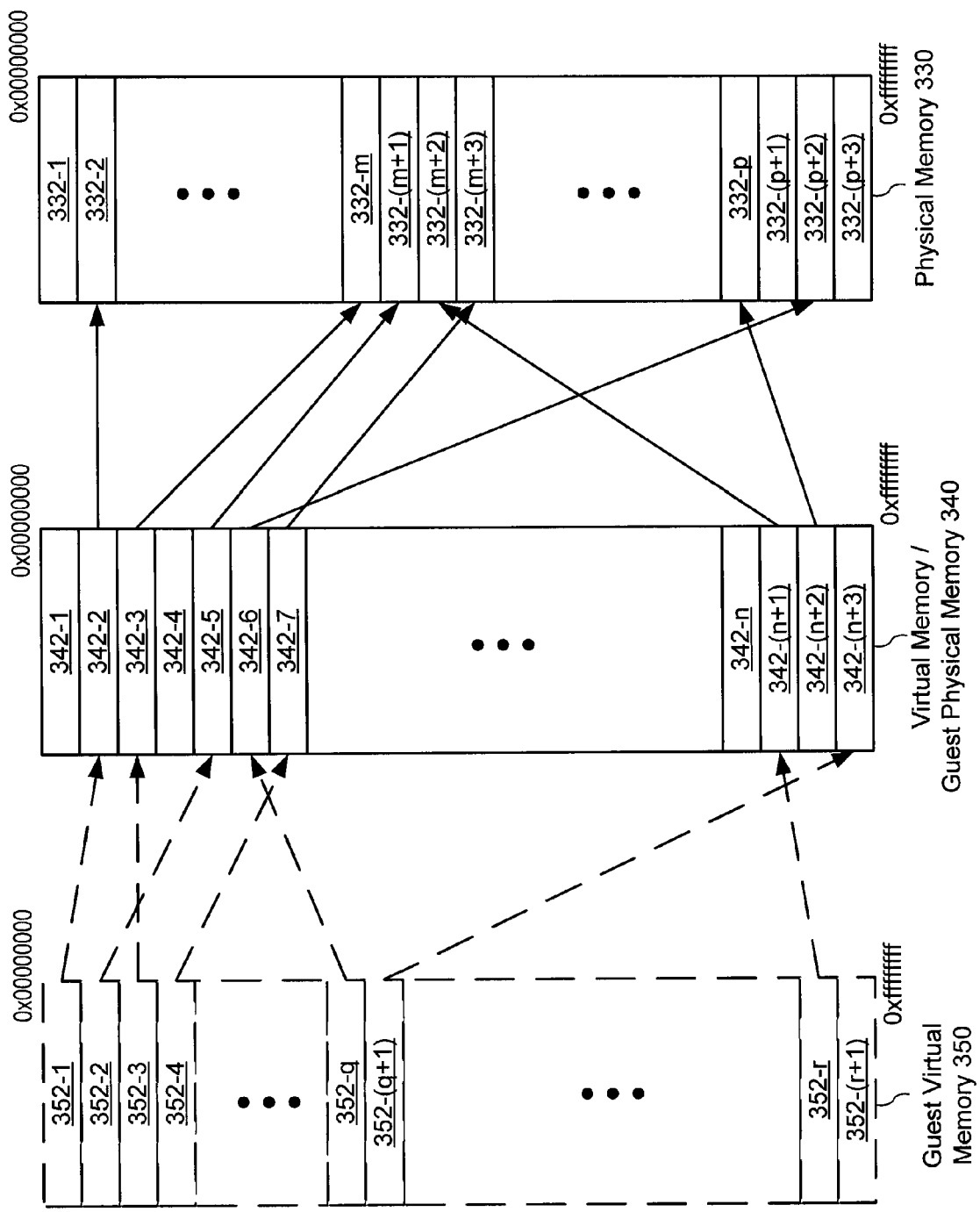
FIG. 3A is a block diagram illustrating exemplary memory structures, in accordance with some embodiments.

FIG. 3A is a block diagram illustrating exemplary memory structures, in accordance with some embodiments. A memory of a computer system (e.g., the memory 206) is segmented into pages (e.g., a physical memory 330 is segmented into multiple pages 332). Each page 332 is typically sized to a predefined number of bytes. For example, a 4 GB memory may be segmented into 1,048,576 (=$2^{20}$) pages of 4 kilobyte (KB) memory. Although a page size of 4 KB is commonly used, smaller or larger pages (e.g., 1 KB or 4 MB) can be used. Each page 332 contains multiple memory addresses (e.g., a 4 KB page typically includes 4,096 addresses). Although FIG. 3A is illustrated with respect to 32-bit addresses (e.g., 0xffffffff), it should be appreciated that the methods and systems described herein can be used with addresses of any other length (e.g., 64-bit addresses).

Frequently, computer systems do not allow software applications to directly access physical memory. Instead, software applications are provided with a virtual memory (e.g., the virtual memory 340). Similar to the physical memory 330, the virtual memory 340 is also segmented into virtual memory pages 342 (typically of the same size and number of pages). When a software application attempts to access a certain address in a certain virtual memory page 342, such virtual memory address in the virtual memory page (e.g., 342) is translated to a physical memory address using a page table (e.g., typically, the host operating system 110 translates a virtual memory address in the virtual memory 340 to a physical memory address in the physical memory 330 using page table(s) 230 in FIG. 2).

In embodiments where the computer system includes a virtual machine (e.g., 113), the address used in the virtual machine requires another level of translation. Applications running in the virtual machine 113 are provided with a type of virtual memory called guest virtual memory 350 (also called guest linear memory). An operating system in the virtual machine 113 (e.g., the decoy operating system 112-1) translates a guest virtual memory address in the guest virtual memory 350 using the decoy OS page table(s) 228 (shown in FIG. 2). The guest virtual memory address is translated to an address in the virtual memory 340 (also called a guest physical memory address). Then, as described above, the host operating system 110 translates the virtual memory address in the virtual memory 340 to a physical memory address in the physical memory 330 using the page table(s) 224.

Figure 3B:
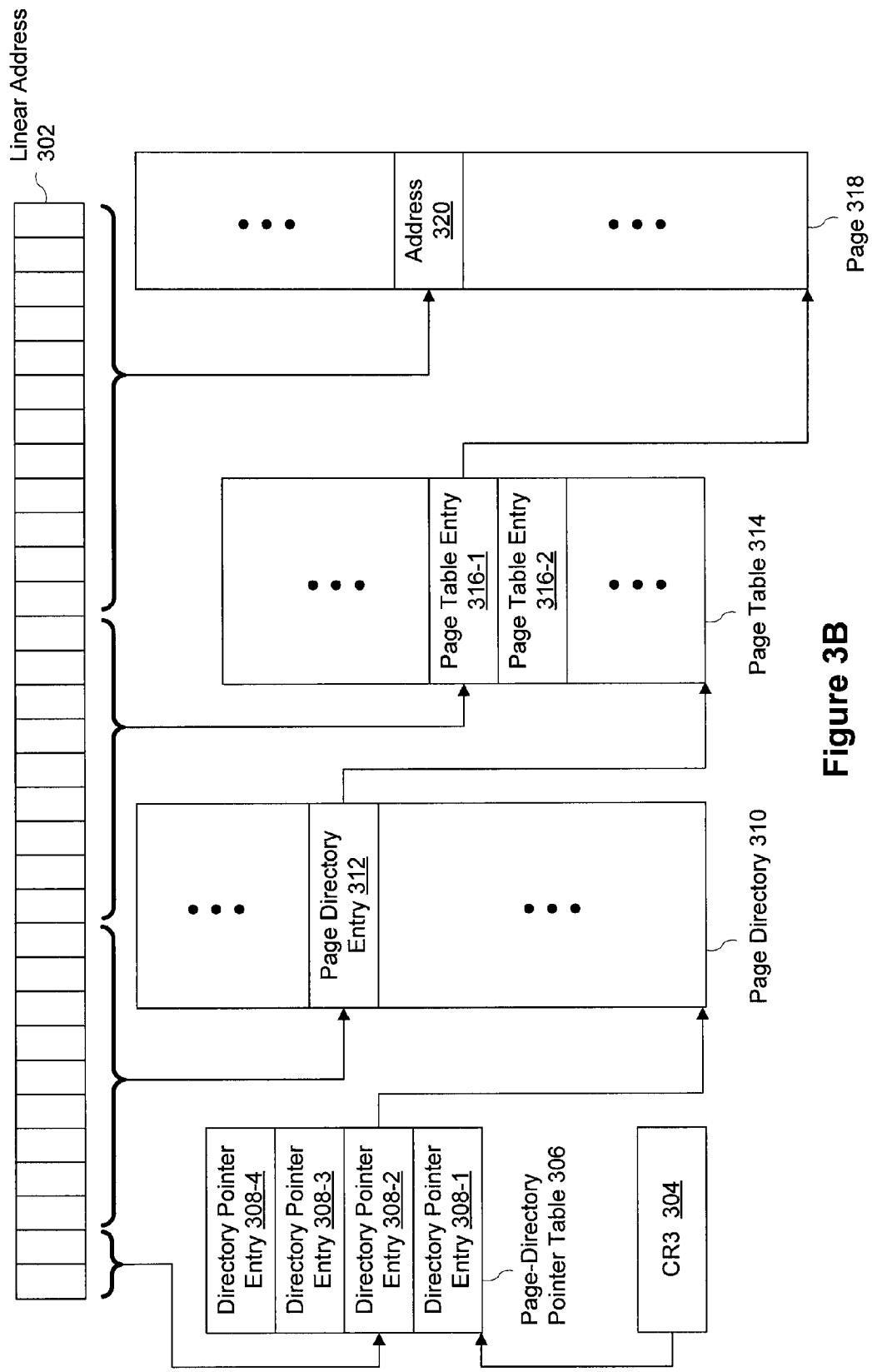
FIG. 3B is a block diagram illustrating an exemplary page table structure, in accordance with some embodiments.

FIG. 3B is a block diagram illustrating an exemplary page table structure, in accordance with some embodiments. The exemplary page table structure illustrated in FIG. 3B is a three-level page table structure common with a Physical Address Extension (PAE) feature for the x86 microprocessor architecture provided by Intel Corporation (Santa Clara, Calif.). The three-level page table structure includes one or more page-directory pointer table 306, one or more page directory(s) 310, and one or more page table(s) 314. A translation of a virtual memory address to a physical memory address (or a guest virtual memory address to a guest physical memory address) is performed by the following steps:

The control register CR3 of a microprocessor includes a pointer to a page-directory pointer table 306. Using the CR3 pointer, the page-directory pointer table 306 is selected.

Using a portion of a linear address 302, an entry 308 in the page-directory pointer table 306 is selected.

The selected entry 308 in the page-directory pointer table 306 includes a pointer to a page directory 310. Using the pointer, the page directory 310 is selected.

Using a portion of the linear address 302, an entry 312 in the page directory 310 is selected.

The selected entry 312 in the page directory 310 includes a pointer to a page table 314. Using the pointer, the page table 314 is selected.

Using a portion of the linear address 302, an entry 316 in the page table 314 is selected.

The selected entry 316 in the page table 314 includes a pointer to a page 318. Using the pointer, the page 318 is selected.

Using a portion of the linear address 302 (called "offset"), an address 320 in the page 318 is obtained. The address 320 corresponds to a physical memory address in the physical memory (e.g., 330).

Although FIG. 3B illustrates the three-level page table structure, any other page table structure can be used (e.g., one-level page table structure, two-level page table structure, four-level page table structure, etc.) to implement the methods described herein. For example, a two-level page table structure may include the page directory 310 and one or more page table(s) 314, but may not include the page-directory pointer table 306.

Figure 3C:
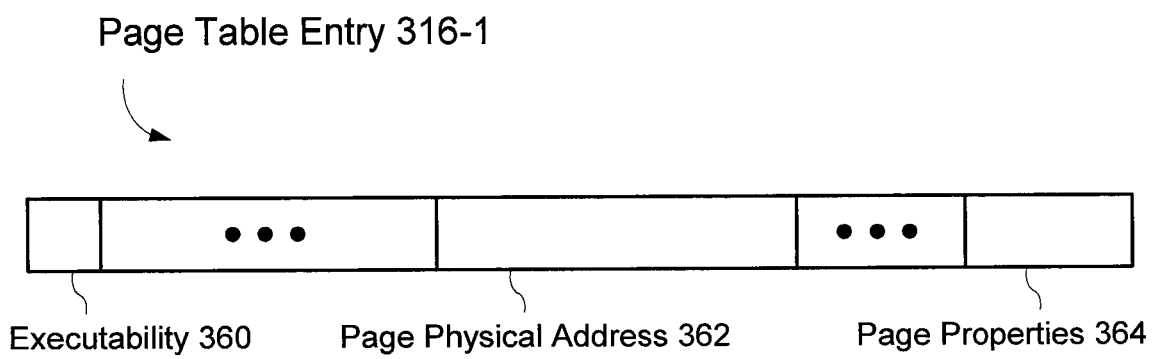
FIG. 3C is a block diagram illustrating an exemplary page table entry, in accordance with some embodiments.

FIG. 3C illustrates an exemplary data structure for a page table entry 316-1, in accordance with some embodiments. A page table entry 316-1 is a series of bits, including a bit (also called a flag) representing executability state 360 of the corresponding page table. The page table entry 316-1 also includes a page physical address 362, which represents a physical address of a corresponding page. In some embodiments, the page table entry 316-1 also includes page properties 364, such as writability, page-level cache enablement, accessed/dirty states, and/or the size of the page table.

FIGS. 4A-4H illustrate an exemplary method of storing target addresses in breakpoint registers for sampling fingerprint data 234 (or forensic data 236 for generating the fingerprint data 234), in accordance with some embodiments.

Breakpoint registers 232 (shown in FIG. 2; e.g., debug registers 410) are useful in setting events to collect forensic data 236 or fingerprint data 234. Breakpoint registers 232 (or debug registers 410) generates an interrupt (also called a fault or an exception), when an address in a program counter (which stores the address of an instruction being executed or the address of an instruction to be executed next; also called an instruction pointer or an instruction address register) matches any of the addresses stored in the breakpoint registers 232 (or debug registers 410). The interrupt can be used as a trigger to collect the fingerprint data 234 (or forensic data 236). Monitoring events that attempt to access critical portion of the memory (e.g., operating system calls, low-level instructions, and sensitive data, etc.) consumes less computing power than monitoring all activity on a computer system.

However, computer systems typically have a limited number of breakpoint registers 232. For example, the x86 microprocessors typically have four debug registers 410. When there are more than four target addresses that need to be monitored, the computer system cannot monitor all target addresses using the debug registers 410, and therefore, unmonitored target addresses may be used for malicious activities. The exemplary process illustrated in FIGS. 4A-4H address this problem by using the breakpoint registers to monitor all target addresses, even when the number of target addresses exceeds the number of breakpoint registers. For example, in some embodiments, the methods described herein can be used to monitor four breakpoints on each page in the guest process, exceeding the conventional limit of four breakpoints across the entire guest process.

Figure 4A:
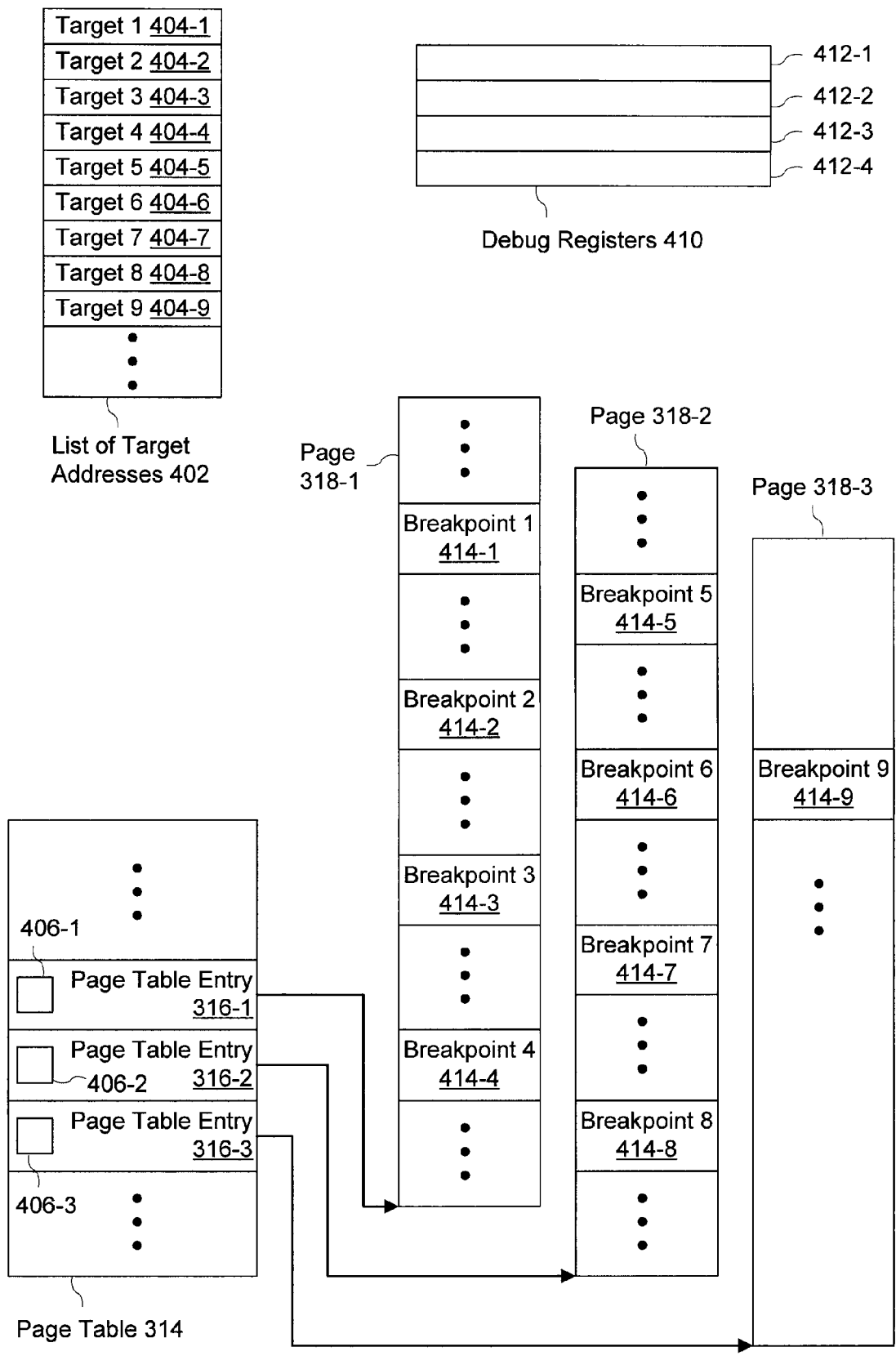
FIGS. 4A-4H are block diagrams illustrating a method of storing target addresses in breakpoint registers, in accordance with some embodiments.

In FIG. 4A, the computer system (e.g., the decoy network device 106) includes in the memory 206 (or has access to): a list of target addresses 402 of interest, one or more page tables 314, and multiple pages 318 (e.g., 318-1 through 318-3). The list of target addresses 402 includes target addresses 404 (e.g., 404-1 through 404-9). Each target address 404 corresponds to a respective breakpoint 414 in one of the multiple pages 318 (e.g., the target address 1 (404-1) corresponds to the breakpoint 1 (414-1); the target address 2 (404-2) corresponds to the breakpoint 2 (414-2); and so forth). The one or more page table 314 includes page table entries 316, and each page table entry 316 has an executability state 406 (e.g., represented by an executability bit or executability state 360 shown in FIG. 3C). In FIG. 4A, all executability states 406 are set as executable (e.g., illustrated as empty boxes). The computer system also includes debug registers 410 (which are a type of breakpoint registers, as explained above), typically in the CPU(s) 202.

Figure 4B:
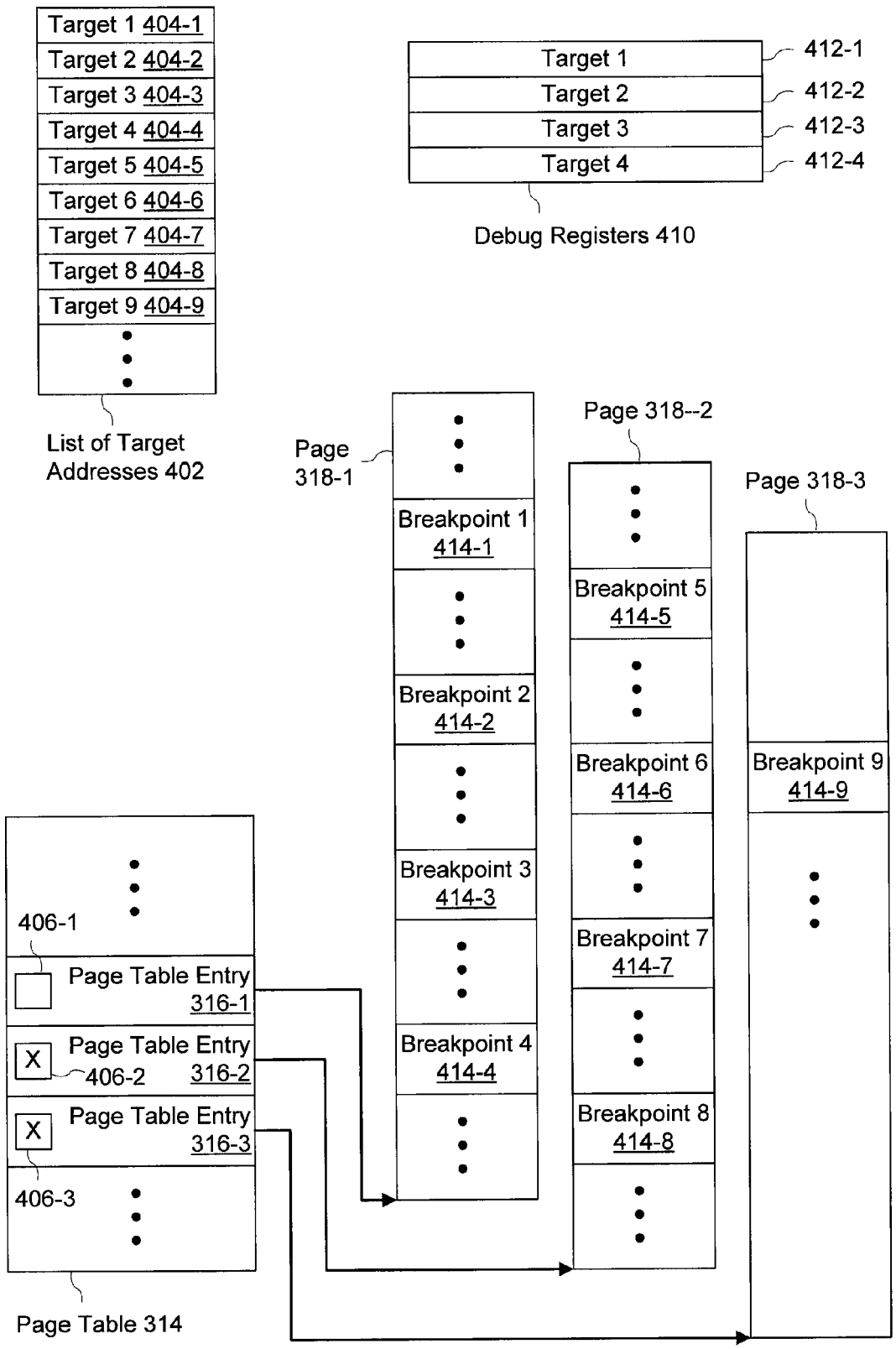

FIG. 4B illustrates that the process starts with identifying pages 318 that correspond to the target addresses 404. The identified pages 318 include a page 318-1. The computer system identifies page table entries 316 that correspond to the identified pages 318. The executability state 406-1 of the page table entry 316-1 that corresponds to the page 318-1 is set as executable (e.g., illustrated as an empty box), and the executability states 406-2 and 406-2 of the page table entries 316-2 and 316-3 that correspond to the remainder of the identified pages (e.g., 318-2 and 318-3) are set as non-executable (e.g., indicated with "x" marks). The computer system stores the target addresses that correspond to the page 318-1 in the debug registers 410 as debug register entries 412 (e.g., the target addresses 1 through 4 corresponding to the breakpoints 1 through 4 (414-1 through 414-4) on the page 318-1 are stored in the debug registers 410).

Figure 4C:
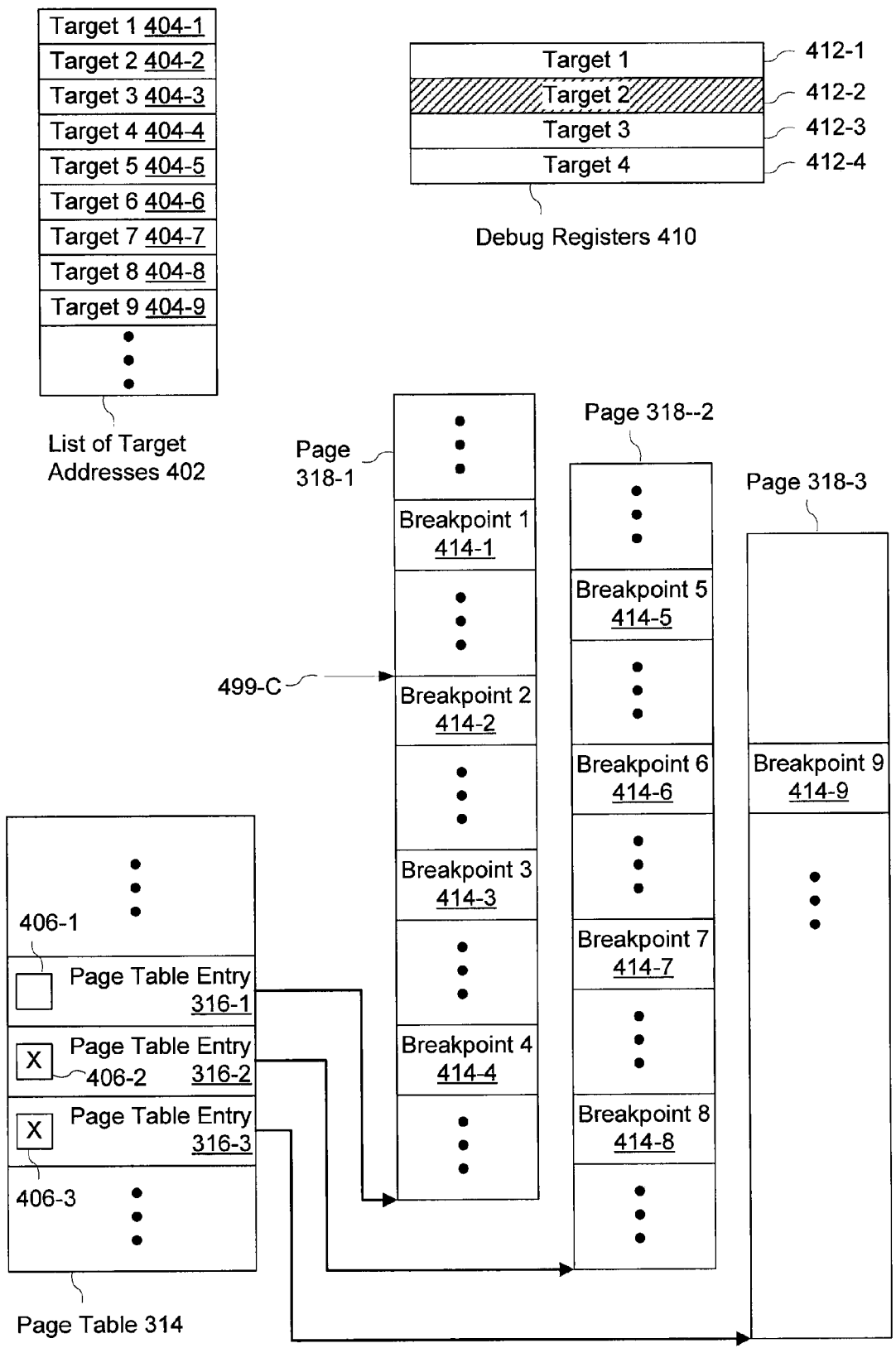

In FIG. 4C, a request 499-C to execute an instruction located at the breakpoint 2 (414-2) is detected, and the debug register generates an interrupt, because the requested address (e.g., the breakpoint 2 (414-2)) matches the target address 2 in the debug register entry 412-2. The computer system, in response to the interrupt, collects fingerprint data 234 (or forensic data 236). After collecting fingerprint data 234 or forensic data 236, the computer system continues the execution of the instructions (or instructions in one or more programs running on the computer system).

Figure 4D:
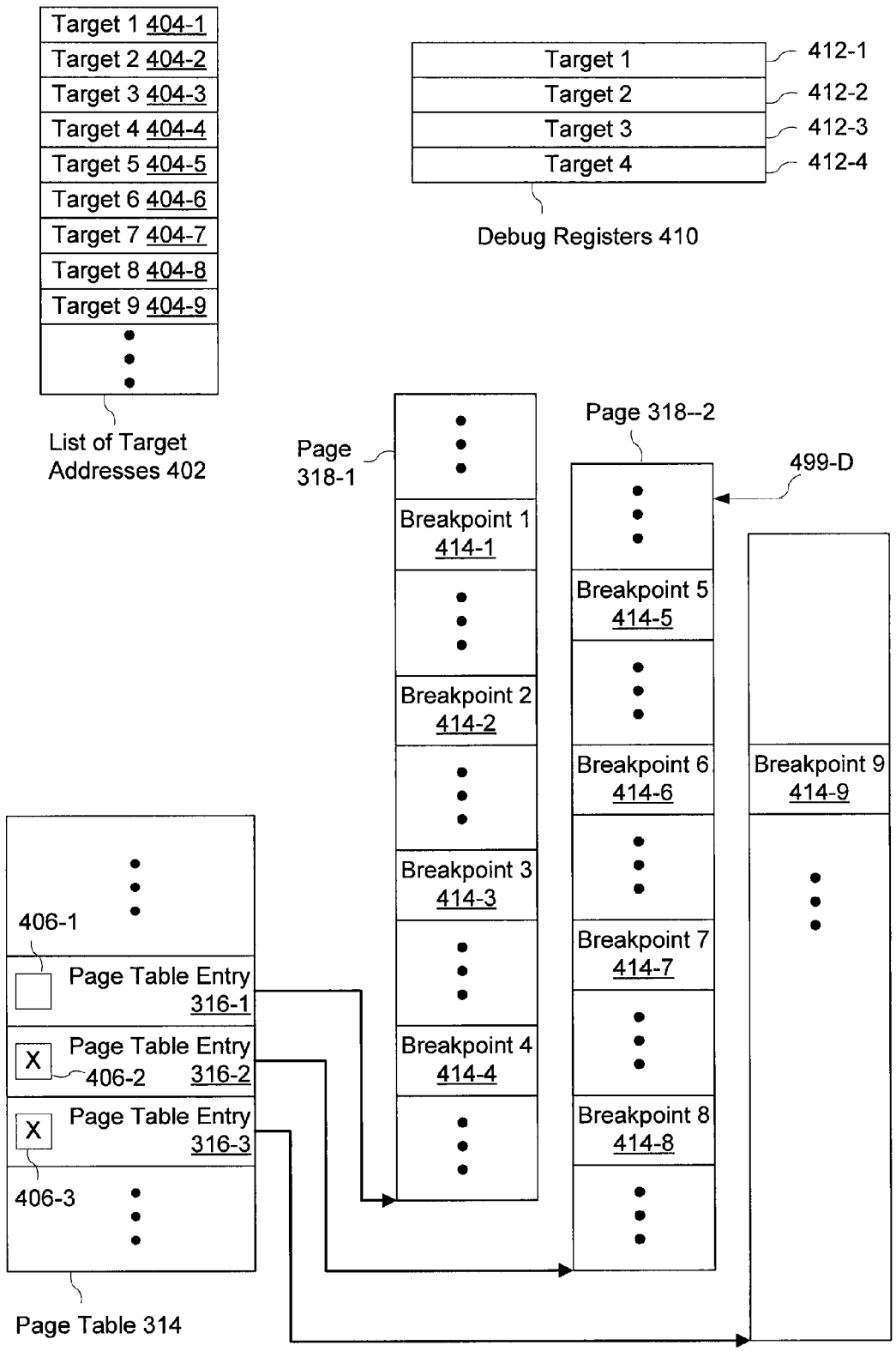

FIG. 4D illustrates that a request 499-D to execute an instruction located on a page 318-2 is detected. The computer system locates a page table entry 316-2 that corresponds to the page 318-2, and determining the executability state 406-2 of the page table entry 316-2. The executability state 406-2 of the page table entry 316-2 is set as non-executable, and therefore, the computer system will not execute instructions located on the page 318-2 until the executability state 406-2 associated with the page 318-2 is set as executable.

Figure 4E:
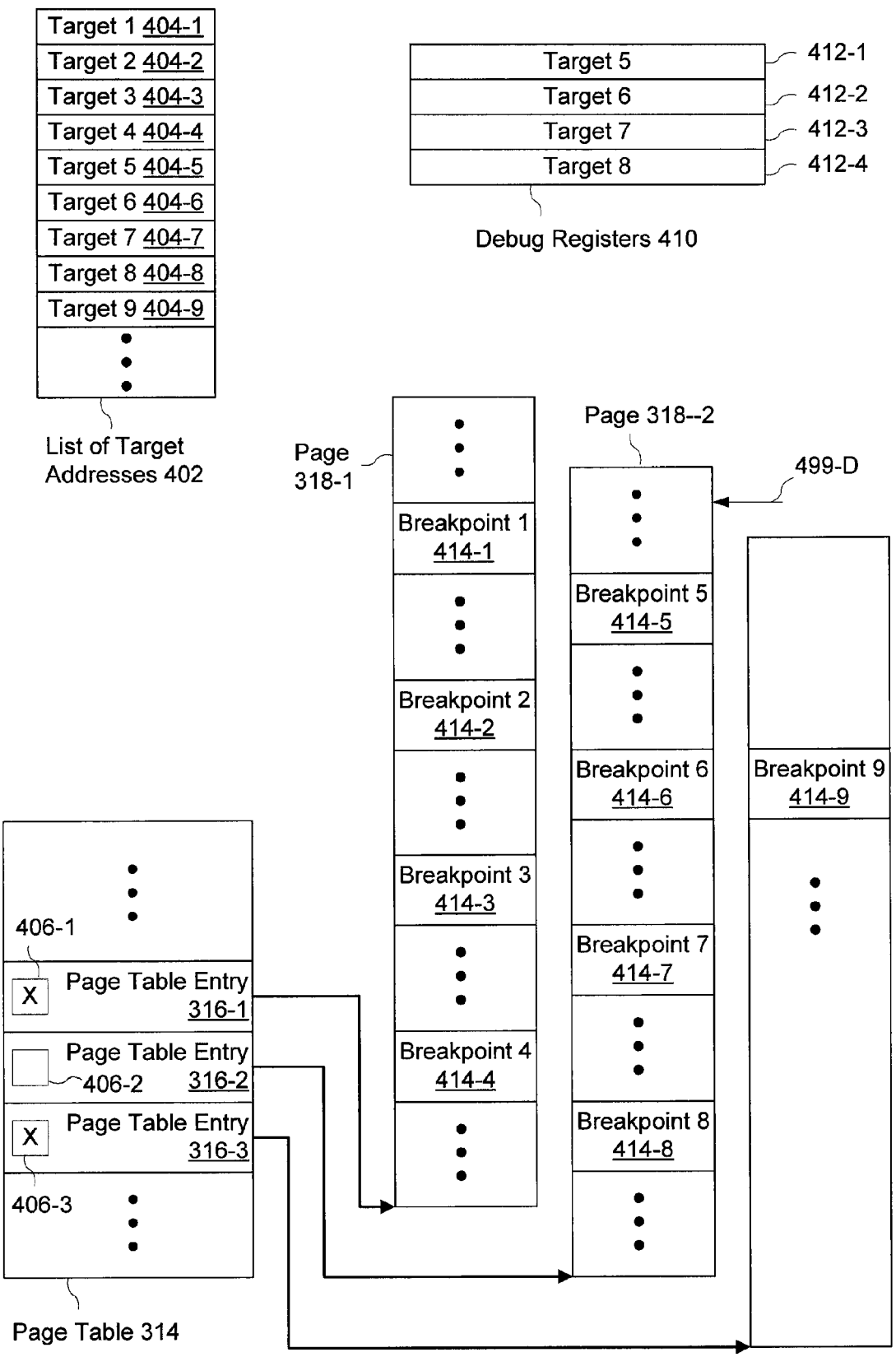

In addition, the target addresses that correspond to the page 318-2 are loaded into the debug registers 410 as illustrated in FIG. 4E (e.g., the target addresses 5 through 8 corresponding to the breakpoints 5 through 8 (414-5 through 414-8) on the page 318-2 are stored in the debug registers 410). The computer system sets the executability state 406-2 associated with the page 318-2 as executable and the executability states 406 associated with other pages that correspond to the target addresses (e.g., 318-1 and 318-3) as non-executable. After setting the executability states, the computer system continues the execution of the instructions (or instructions in one or more programs).

Figure 4F:
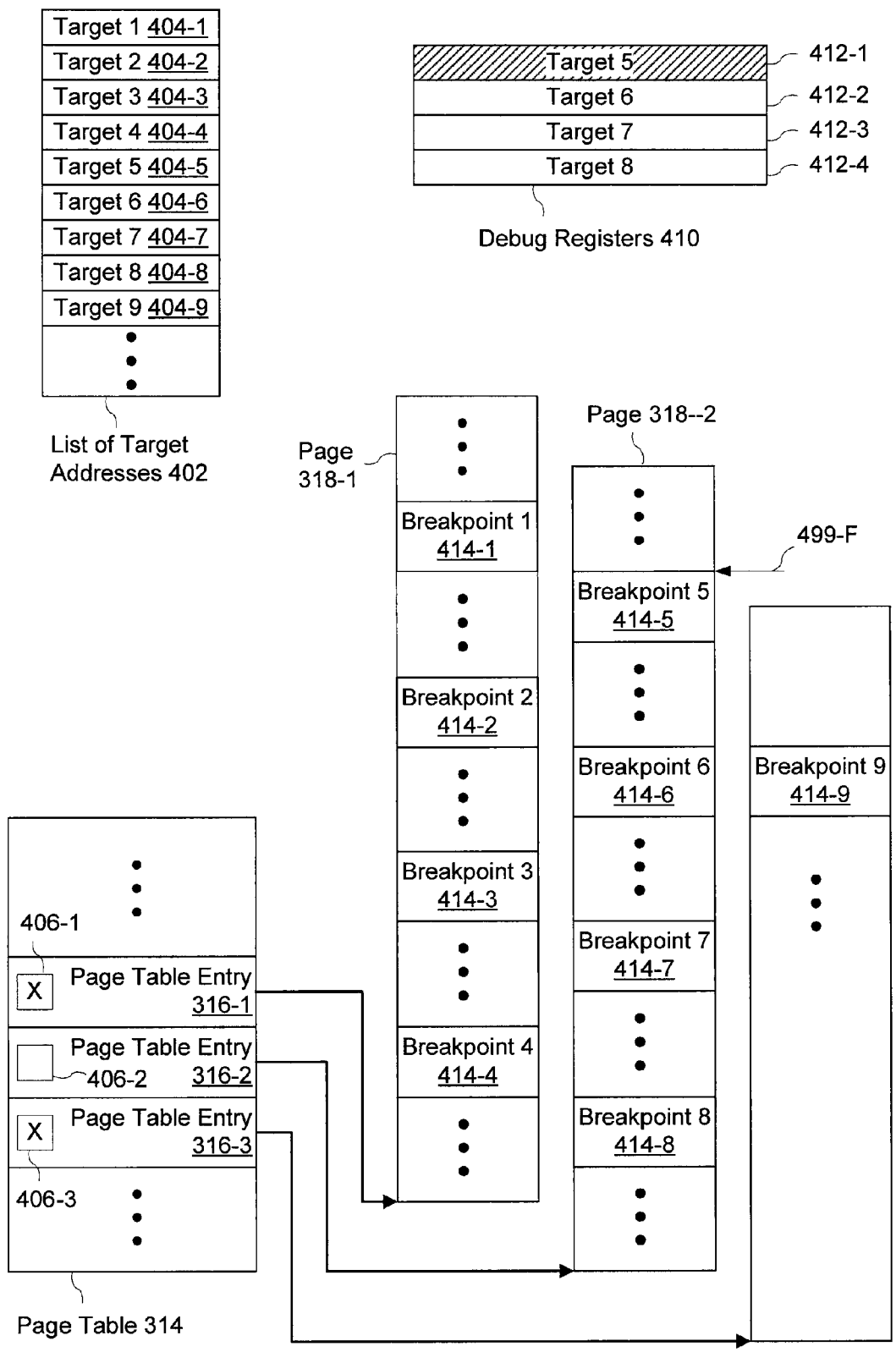

FIG. 4F illustrates that a request 499-F to execute an instruction located at the breakpoint 5 (414-5) is detected. In response, the debug register generates an interrupt, as the address of the breakpoint 5 (414-5) matches a target address 412-1 in the debug register entry 412-1 in the debug registers 410. In response to the interrupt, fingerprint data 234 (or forensic data 236) are collected. After collecting fingerprint data 234 or forensic data 236, the execution of the instructions (or instructions in one or more programs) is continued.

Figure 4G:
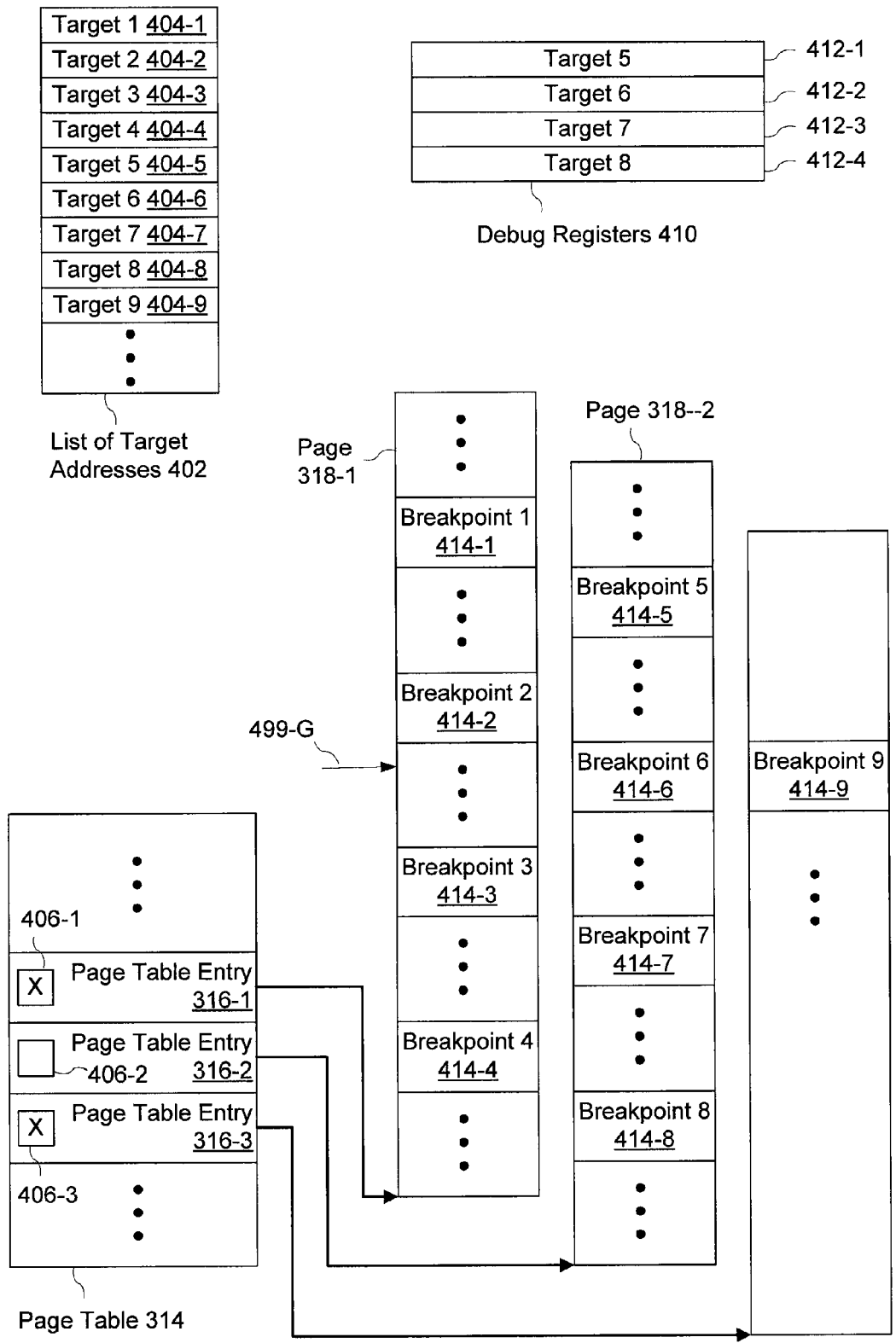

In FIG. 4G, a request 499-G to execute an instruction located at an address on the page 318-1 is detected. Because the executability state 406-1 associated with the page 318-1 is set as non-executable, the computer system will not execute instructions located on the page 318-1 until the executability state 406-1 associated with the page 318-1 is set as executable.

Figure 4H:
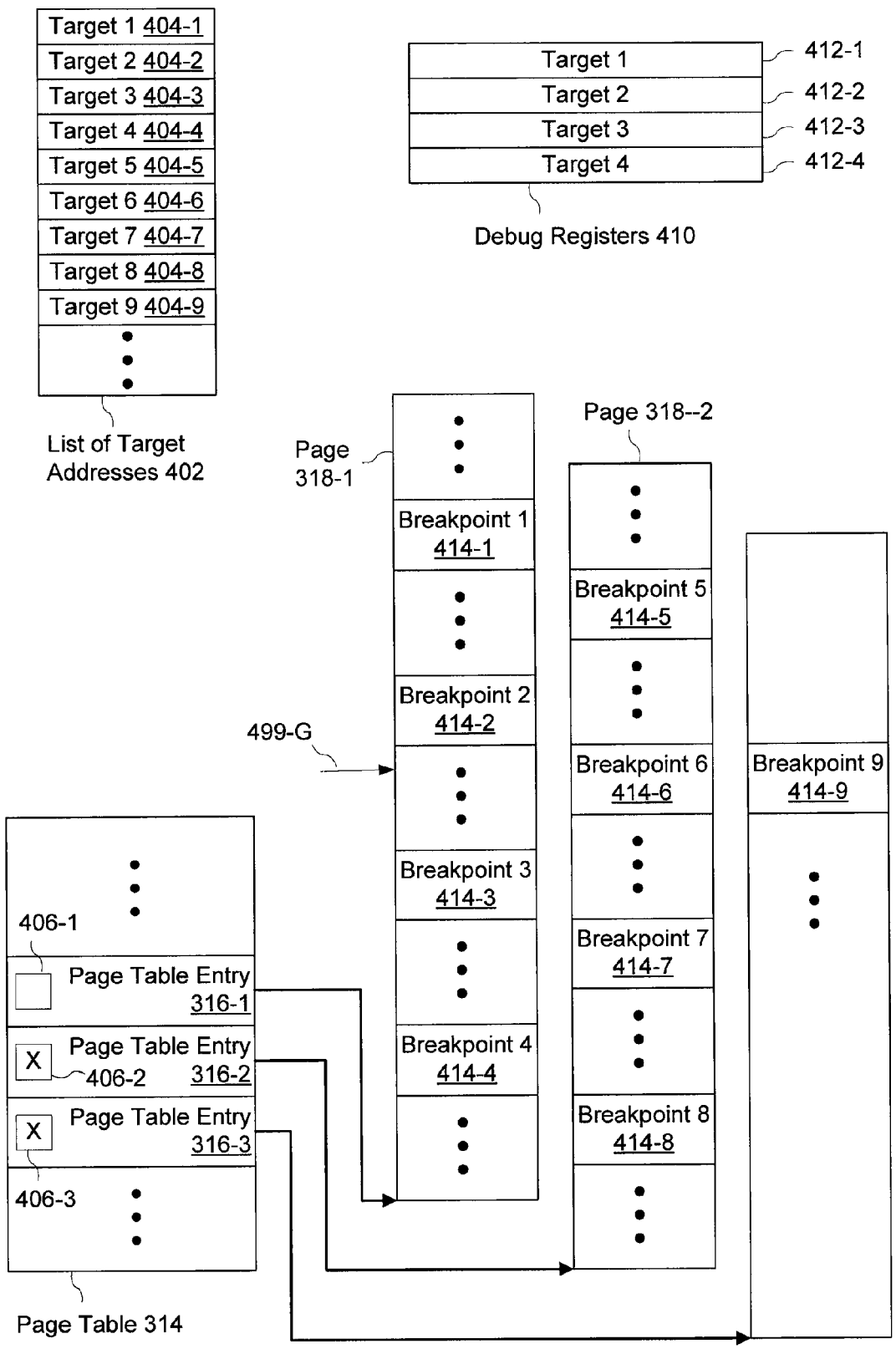

FIG. 4H illustrates that the target addresses that correspond to the page 318-1 are stored in the debug registers 410. In addition, the executability state 406-1 is set as executable, and the executability states 406-2 and 406-3 are set as non-executable. The steps illustrated in FIGS. 4A-4H are repeated until sufficient fingerprint data 234 (or forensic data 236) are collected or for a preset duration.

Figure 5A:
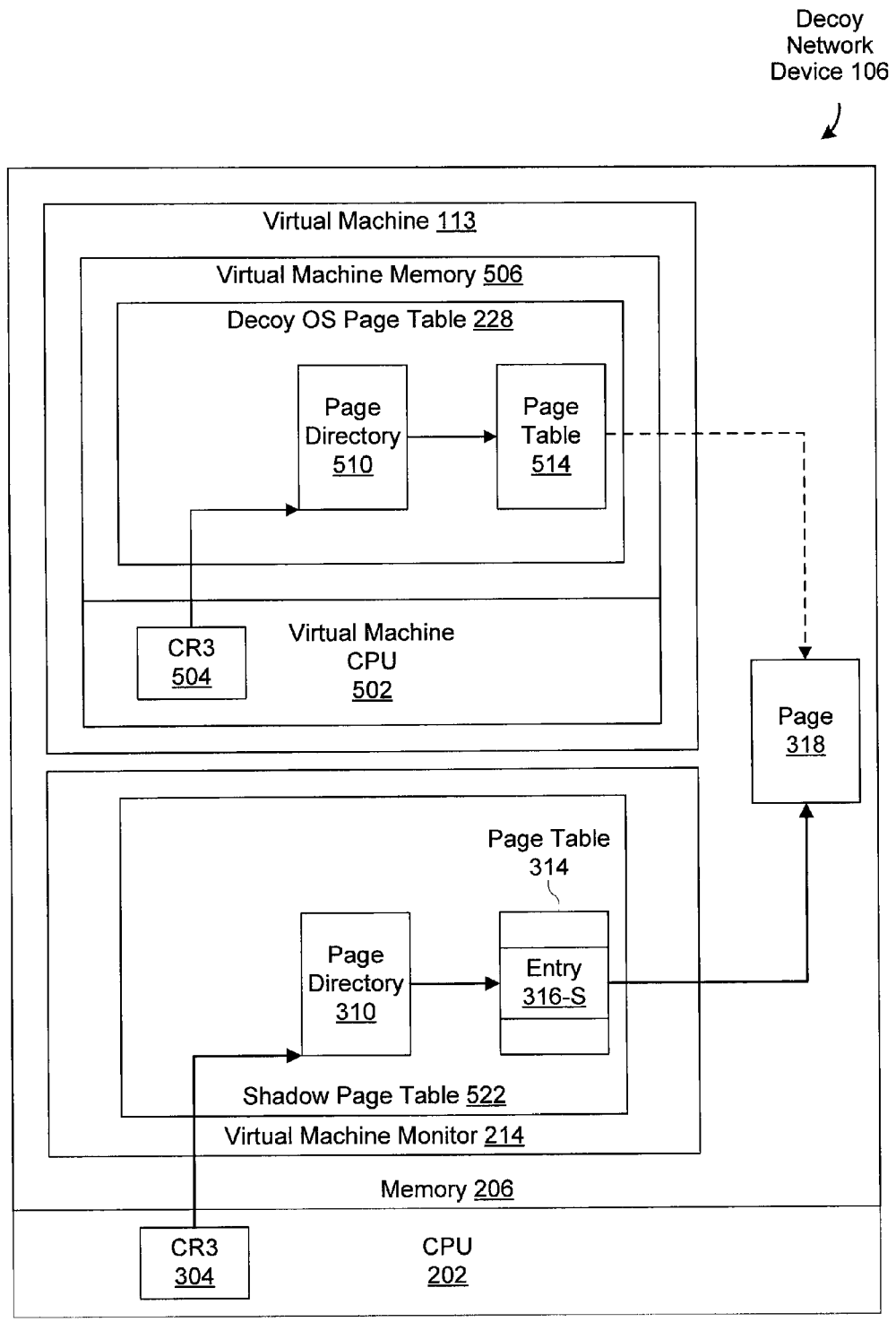
FIGS. 5A-5B are block diagrams illustrating methods of mapping a guest virtual memory address to a page, in accordance with some embodiments.
Figure 5B:
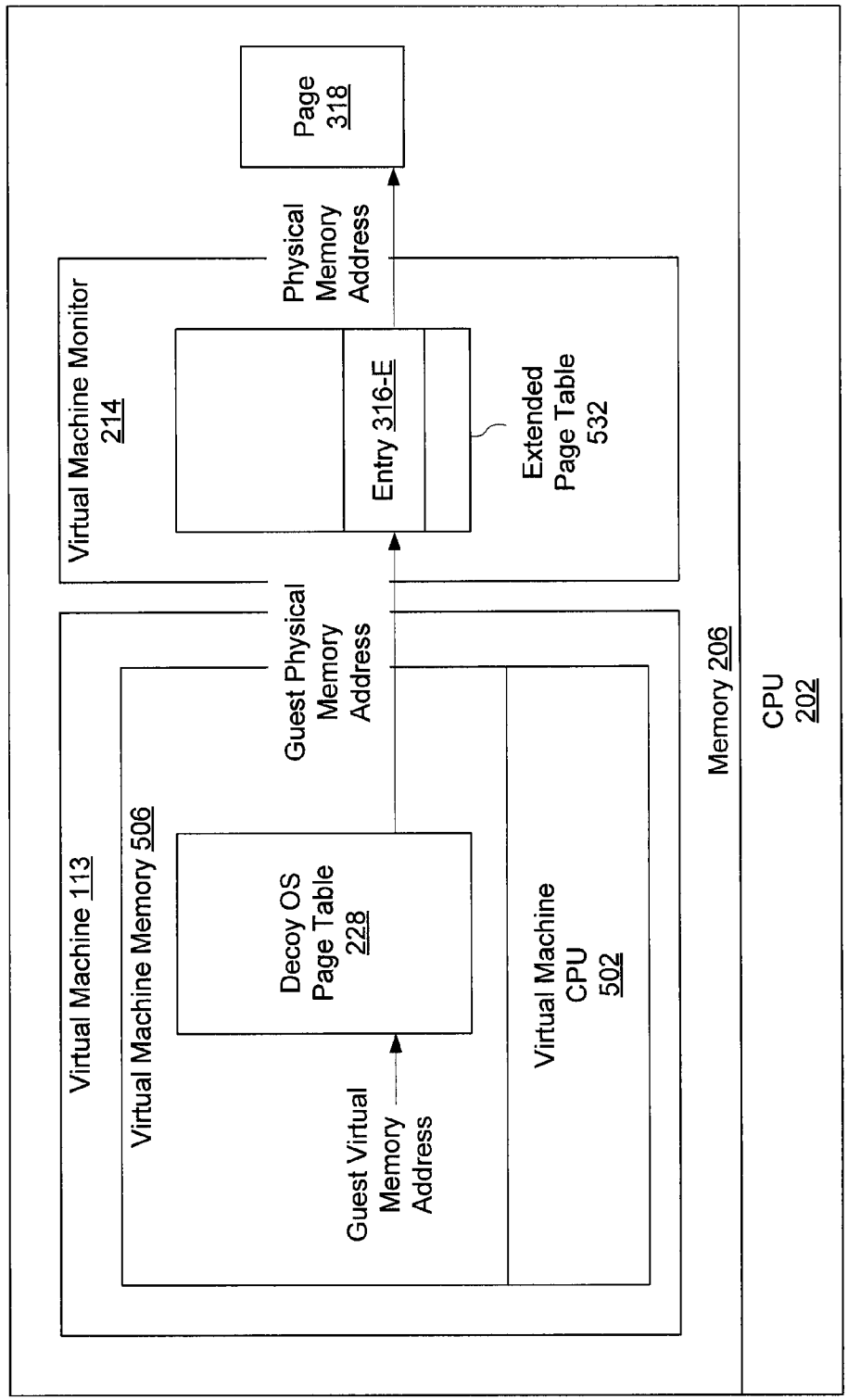
Figure 6A:
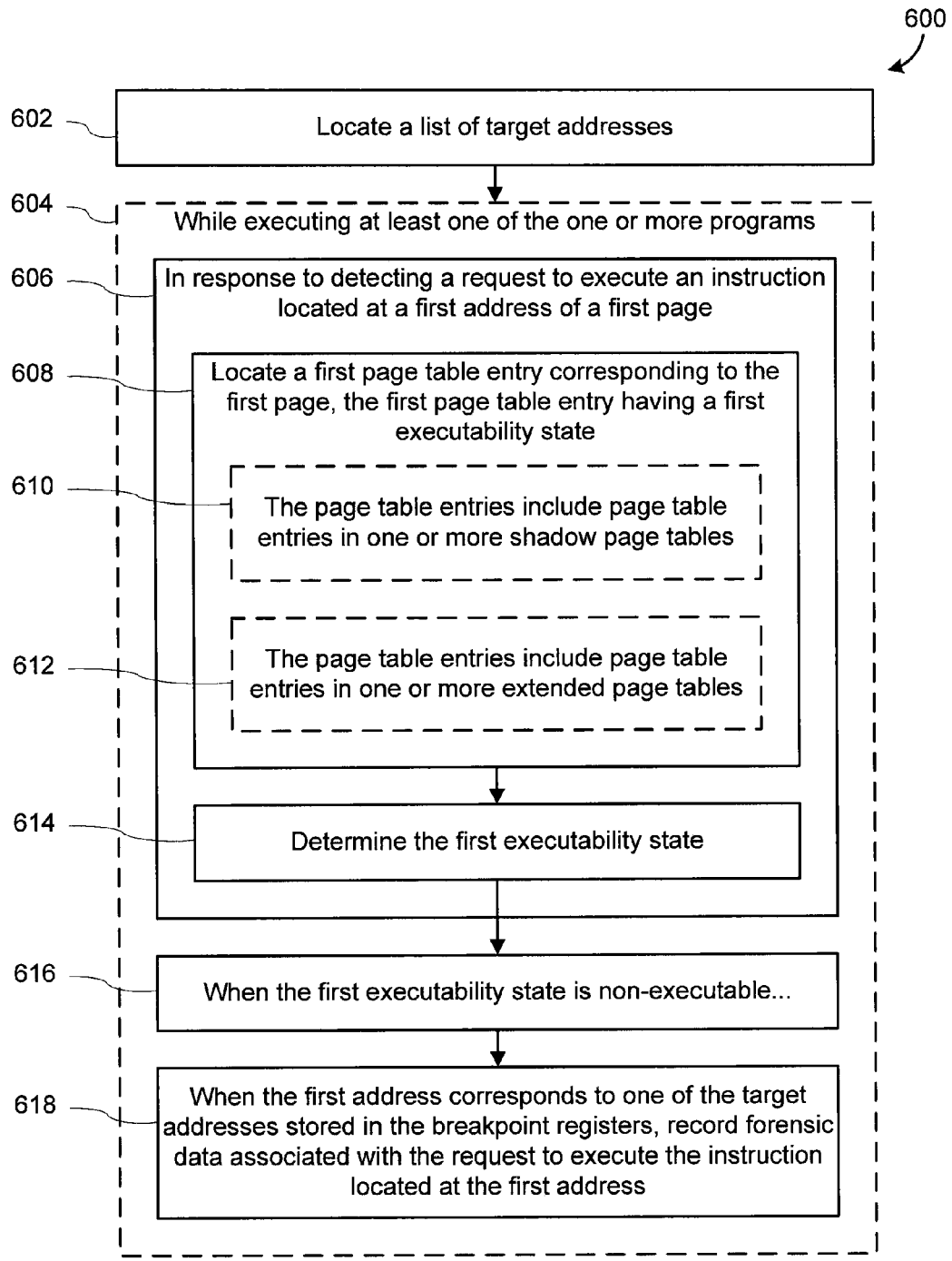
FIGS. 6A-6D are flowcharts representing a method of monitoring a computer system, in accordance with some embodiments.
Figure 6B:
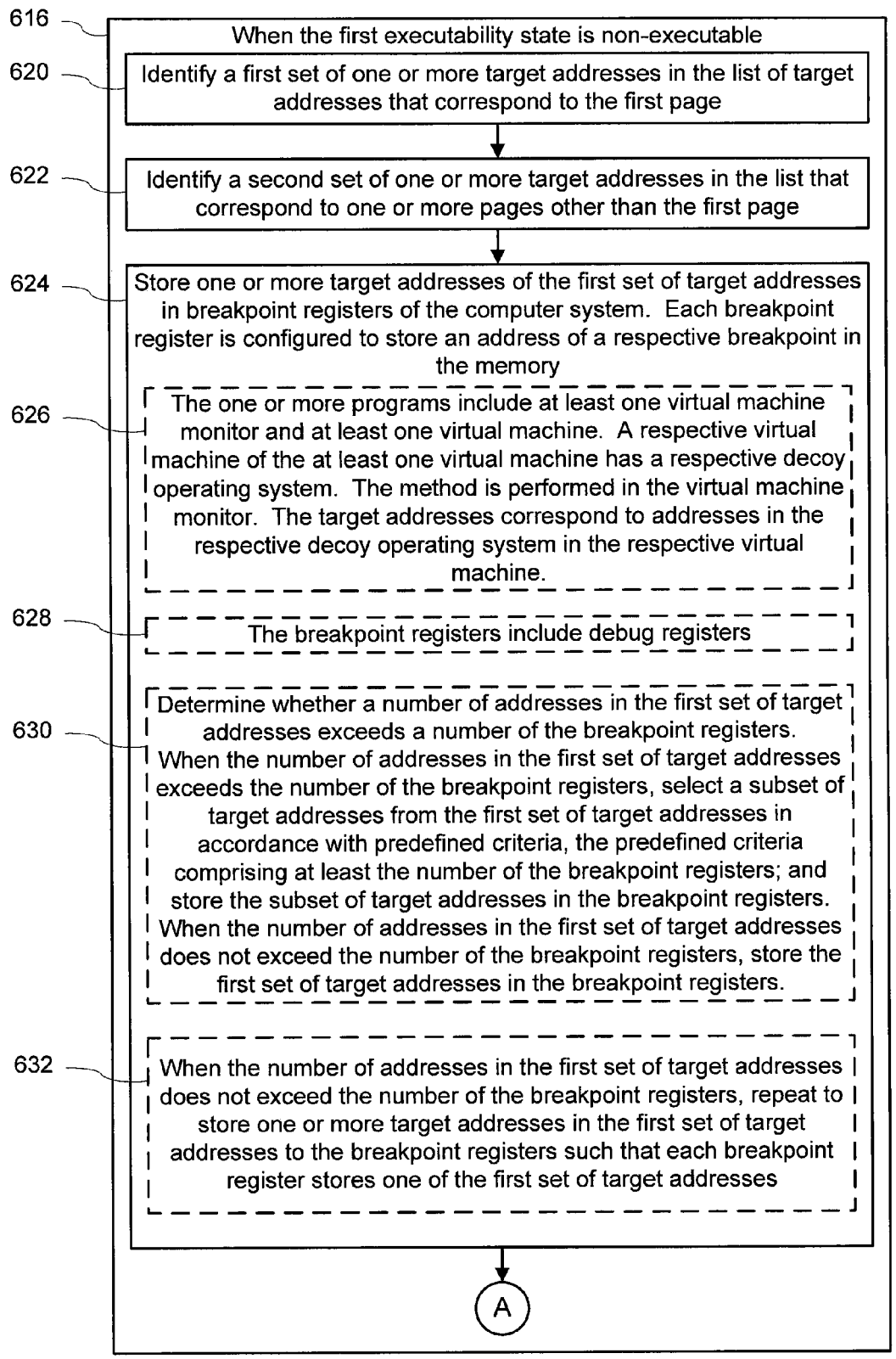
Figure 6C:
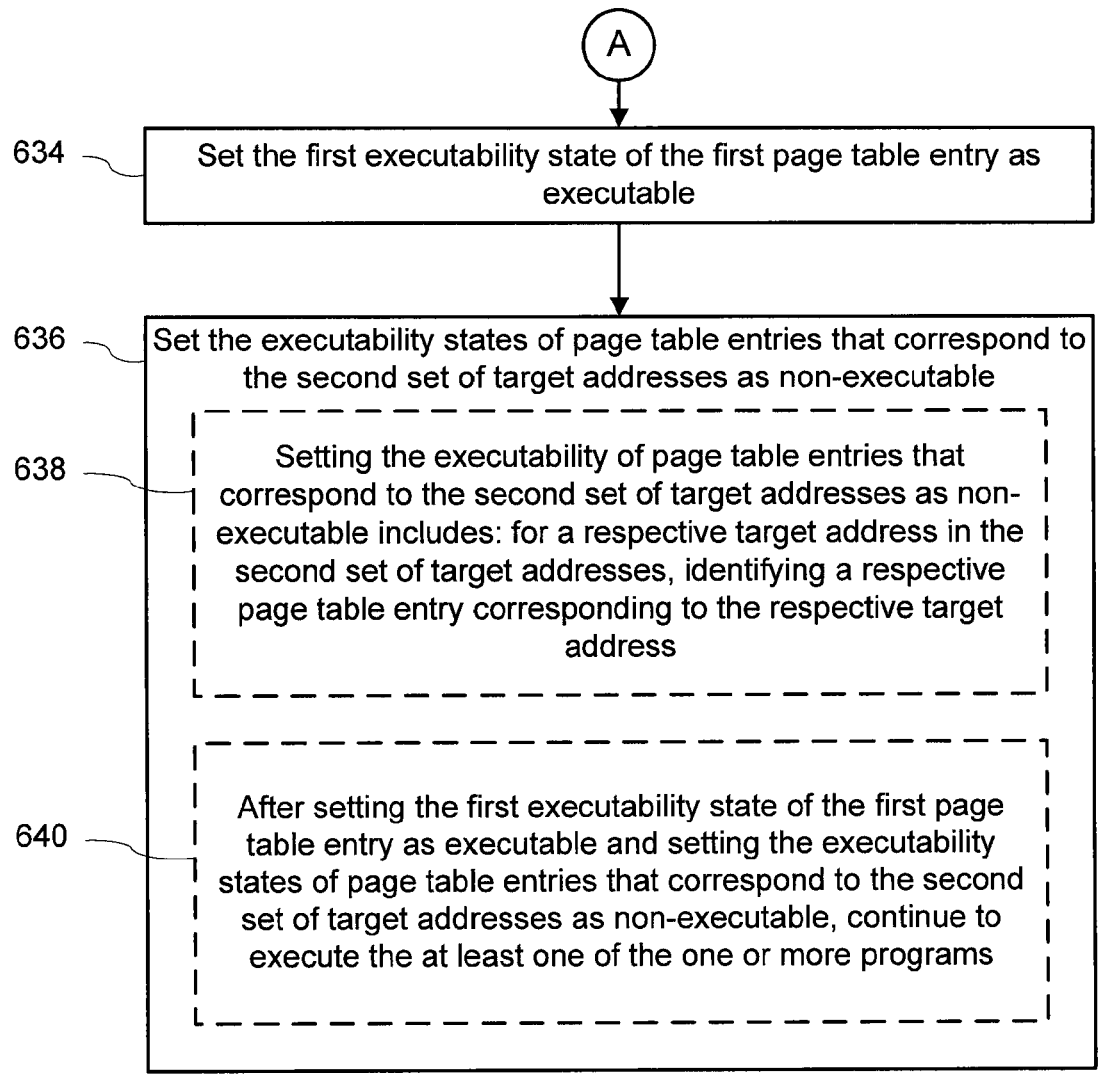
Figure 6D:
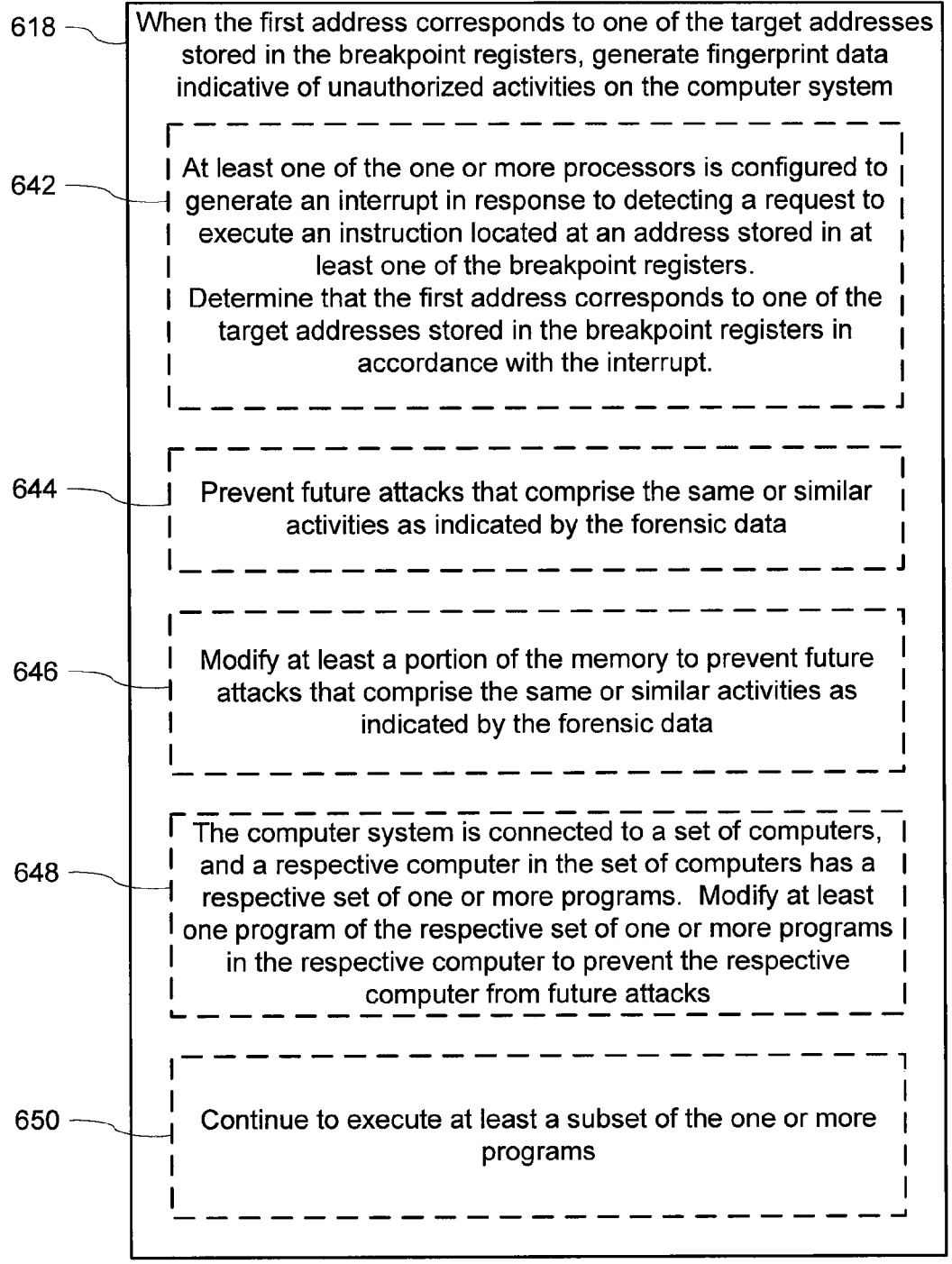

FIGS. 5A-5B illustrate methods of mapping a guest virtual memory address to a page, in accordance with some embodiments.

In FIG. 5A, the decoy network device 106 includes a virtual machine 113 and a virtual machine monitor 214. The virtual machine 113 (or the decoy operating system 112 in the virtual machine 113, as shown in FIG. 2) maintains a decoy OS page table 228 in the virtual machine memory 506 (which is a virtual memory). The virtual machine monitor 214 maintains a shadow page table 522 which is a replica of the decoy OS page table 228. When the virtual machine 113 receives a request to access a particular address, the virtual machine CPU 502 walks through the decoy OS page table 228 using a virtual machine CR3 504, a page directory 510, and a page table 514 (e.g., in a manner described with reference to FIG. 3B). However, instead of using the address in the page table 514, the CPU 202 in the decoy network device 108 walks through the shadow page table 522 using the CR3 304, a page directory 310, and a page table 314. A page table entry 316-S in the page table 314 includes a physical memory address corresponding to the page 318. The physical memory address in the page table entry 316-S is used to access the page 318.

In some embodiments, the page table entry 316-S in the shadow page table 522 (also called a shadow page table entry) includes an executability state (in a manner analogous to the page table entry 316 illustrated in FIG. 3C). When the virtual machine monitor 214 sets the executability state of the shadow page table entry 316-S, a request to access page 318 generates an interrupt, which can be used to collect fingerprint data 234 (or forensic data 236). Such interrupt is invisible to a software application running in the virtual machine 113, because the shadow page table 522 is not accessible from the virtual machine 113. Therefore, a malicious code or an unauthorized activity running on the virtual machine 113 cannot distinguish whether such code or activity is being monitored by another software application using executability states.

FIG. 5B illustrates an alternative method of mapping a guest virtual memory address to a page, in accordance with some embodiments. In FIG. 5B, the decoy network device 106 includes a virtual machine 113 and a virtual machine monitor 214. The virtual machine 113 (or the decoy operating system 112 in the virtual machine 113, as shown in FIG. 2) maintains a decoy OS page table 228, which is used to translate a guest virtual memory address to a guest physical memory address. The virtual machine monitor 214 (or the CPU 202) maintains an extended page table 522, which is used to translate a guest physical memory address to a physical memory address. When the virtual machine 113 receives a request to access a particular address, the virtual machine CPU 502 walks through the decoy OS page table 228 to obtain the guest physical memory address. The virtual machine monitor 214 walks through the extended page table 532 to translate the guest physical memory address to the physical memory address corresponding to the page 318. The extended page table 532 includes a page table entry 316-E.

In some embodiments, the page table entry 316-E in the extended page table 532 (also called an extended page table entry) includes an executability state (in a manner analogous to the page table entry 316 illustrated in FIG. 3C). When the virtual machine monitor 214 sets the executability state of the extended page table entry 316-E, a request to access page 318 generates an interrupt, and the interrupt can be used to collect fingerprint data 234 (or forensic data 236). Such interrupt is invisible to a software application running in the virtual machine 113, because the extended page table 532 is not directly accessible from the virtual machine 113. Therefore, a malicious code or an unauthorized activity running on the virtual machine 113 cannot distinguish whether such code or activity is being monitored by another software application using executability states.

FIGS. 6A-6D are flowcharts representing a method 600 of monitoring a computer system (e.g., the virtual machine 113-1 or a virtual machine in a protected network device 136), in accordance with some embodiments. The method 600 is performed at a computer system (e.g., the decoy network device 106 or the protected network device 136) having one or more processors and memory storing one or more programs for execution by the one or more processors.

The computer system locates (602) a list of target addresses. In some embodiments, locating the list of target addresses includes checking whether the list of target addresses is present. For example, the computer system receives or retrieves the list of target addresses 402 (shown in FIG. 4A). The list of target addresses 402 may be located within the memory 206 or in a remotely located device (e.g., a remote hard drive or another computer system).

In some embodiments, the computer system performs the following operations (operations 606 through 650), while executing at least one of the one or more programs (604). For example, such operations (e.g., operations 606 through 650) are performed while the computer system runs at least one virtual machine monitor 214 and at least one virtual machine 113-1. Alternatively, such operations (e.g., operations 606 through 650) are performed while the computer system runs a normal hypervisor OS user process 114 or any other program.

In response to detecting a request to execute an instruction located at a first address of a first page (606), the computer system locates (608) a first page table entry corresponding to the first page, the first page table entry having a first executability state. For example, in FIG. 4D, the computer system detects a request 499-D to execute an instruction located at a first address on a first page (e.g., page 318-2).

In some embodiments, the page table entries include (610) page table entries in one or more shadow page tables. In some embodiments, the page table entries include (612) page table entries in one or more extended page tables. For example, when the first address is a guest virtual memory address used in a virtual machine 113, the page table entry can be an entry in a shadow page table (e.g., entry 316-S in the shadow page table 522 in FIG. 5A) or an extended page table (e.g., entry 316-E in the extended page table 532 in FIG. 5B).

The computer system determines (614) the first executability state. For example, the computer system checks a state of the first executability state 406-2 corresponding to the page 318-2 (e.g., see FIG. 4D). In FIG. 4D, the first executability state 406-2 is set as non-executable (indicated with an "x" mark).

When the first executability state is non-executable (616), the computer system identifies (620) a first set of one or more target addresses in the list of target addresses that correspond to the first page. For example, the computer system identifies target addresses corresponding to the page 318-2, which are target addresses 5 through 8 (404-5 through 8) that correspond to breakpoint addresses 5 through 8 (414-5 through 8) on the page 318-2.

The computer system identifies (622) a second set of one or more target addresses in the list that correspond to one or more pages other than the first page. For example, the computer system identifies the remainder of the target addresses in the list of target addresses 402, which are target addresses 1 through 4 and 9 (404-1 through 4 and 404-9).

The computer system stores (624) one or more target addresses of the first set of target addresses in breakpoint registers of the computer system. Each breakpoint register is configured to store an address of a respective breakpoint in the memory. In FIG. 4E, the computer system stores the target addresses 5 through 8 in the debug registers 410.

In some embodiments, the one or more programs include (626) at least one virtual machine monitor and at least one virtual machine. A respective virtual machine of the at least one virtual machine has a respective decoy operating system (e.g., 112). The method (e.g., at least one of operations 602, 604, 606, 608, and 614) is performed in the at least one virtual machine monitor. The target addresses correspond to addresses in the respective decoy operating system in the respective virtual machine.

In some embodiments, the one or more processors include the one or more breakpoint registers (e.g., breakpoint registers 232 in FIG. 2). In some embodiments, the breakpoint registers 232 include (628) debug registers (i.e., the debug registers 410 are a type of breakpoint registers 232, frequently used for, including but not limited to, debugging purposes).

In some embodiments, storing the first set of target addresses in the breakpoint registers includes (630) determining whether a number of addresses in the first set of target addresses exceeds a number of the breakpoint registers. When the number of addresses in the first set of target addresses exceeds the number of the breakpoint registers, the computer system selects a subset of target addresses from the first set of target addresses in accordance with predefined criteria. The predefined criteria comprising at least the number of the breakpoint registers. The computer system stores the subset of target addresses in the breakpoint registers. When the number of addresses in the first set of target addresses does not exceed the number of the breakpoint registers, the computer system stores the first set of target addresses in the breakpoint registers. For example, when the computer system has four breakpoint registers and the first set of target addresses includes less than four target addresses (e.g., one, two, or three), the computer system stores each target address in the first set of target addresses. When the computer system has four breakpoint registers and the first set of target addresses include more than four target addresses (e.g., five or more), the computer system selects four target addresses out of the first set of target addresses, and stores the selected target addresses in the breakpoint registers. In some embodiments, each target address is given a priority (e.g., as measured by a priority level, such as 1, 2, and 3; or a score, for example, between 0 and 100), and the selection is based on the priority. In some embodiments, the target addresses are selected based on the distance from the current execution point (e.g., as indicated by a program counter). In some embodiments, the target addresses located after the current execution point are selected. Any combination of the above described methods can be used in selecting a subset of the target addresses.

In some embodiments, the breakpoint registers are used for monitoring both function entry points and function exits (also called function exit points). For example, when the computer system has four breakpoint registers, four function entry points are monitored by storing corresponding addresses in the four breakpoint registers. When one of the four function entry points is called (as monitored by the breakpoint registers), the address of the called function entry point is replaced with a corresponding function exit point, thereby allowing the system to monitor both entry into, and exit from, a respective function. This in-process substitution of the function entry point with the function exit point allows monitoring both four function entry point and four related function exit points using four breakpoint registers instead of monitoring two function entry points and two function exit points without using the in-process substitution.

In some embodiments, when the number of addresses in the first set of target addresses does not exceed the number of the breakpoint registers, the computer system removes addresses other than the first set of target addresses from the breakpoint registers. For example, when the computer system has four breakpoint registers and the first set of target addresses includes two target addresses, the computer system stores the two target addresses in the first set of target addresses. If the breakpoint registers stores any other addresses other than the first set of target addresses (e.g., from a previous operation), the computer system removes addresses other than the first set of target addresses from the breakpoint registers.

In some embodiments, when the number of addresses in the first set of target addresses does not exceed the number of the breakpoint registers, the computer system repeats (632) to store one or more target addresses in the first set of target addresses to the breakpoint registers such that each breakpoint register stores one of the first set of target addresses. For example, when the computer system has four breakpoint registers and the first set of target addresses includes two target addresses (e.g., target address 1 and target address 2), the computer system stores the two target addresses (e.g., target address 1 and target address 2) in two of the breakpoint registers, and in addition stores one or more of the target addresses to the remaining two breakpoint registers. As a result, the breakpoint registers can store a set of target address 1, target address 2, target address 2, and target address 2; a set of target address 1, target address 2, target address 1, and target address 1; or a set of target address 1, target address 2, target address 1, and target address 2.

The computer system sets (634) the first executability state of the first page table entry as executable. For example, the computer system sets the first executability state 406-2 as executable (e.g., illustrated as an empty box in FIG. 4E).

The computer system sets (636) the executability states of page table entries that correspond to the second set of target addresses as non-executable. For example, the computer system sets the executability states 406-1 and 406-3 as non-executable (e.g., indicated with "x" marks in FIG. 4E).

In some embodiments, setting the executability states of page table entries that correspond to the second set of target addresses as non-executable includes (638): for a respective target address in the second set of target addresses, identifying a respective page table entry corresponding to the respective target address. For example, setting the executability states 406-1 and 406-3 of page table entries 316-1 and 316-3 includes identifying page table entries 316-1 and 316-3 that correspond to the pages 318-1 and 318-3.

In some embodiments, after setting the first executability state of the first page table entry as executable and setting the executability states of page table entries that correspond to the second set of target addresses as non-executable, the computer system continues (640) to execute the at least one of the one or more programs. As a result, an attacker performing unauthorized activities does not know that her activity is being monitored, because the one or more programs continue to operate (i.e., there is no indication that the one or more programs are stopped).

When the first address corresponds to one of the target addresses stored in the breakpoint registers, the computer system records (618) forensic data associated with the request to execute the instruction located at the first address (e.g., information about one or more files and/or processes making the request, information about one or more files and/or processes located at the first address, a snapshot of the system (e.g., system registers, files, file structures, etc.), a snapshot of a portion of the memory (e.g., memory dump), or any combination thereof).

In some embodiments, at least one of the one or more processors is configured (642) to generate an interrupt (e.g., debug exception) in response to detecting a request to execute an instruction located at an address stored in at least one of the breakpoint registers. The computer system determines that the first address corresponds to one of the target addresses stored in the breakpoint registers in accordance with the interrupt.

In some embodiments, the computer system prevents (644) future attacks that comprise the same or similar activities as indicated by the forensic data (e.g., close a vulnerable network socket; modify a process such that the modified process does not respond to unauthorized activities; move the vulnerable file or process to a different location; encrypt the vulnerable file; increase the privilege requirement for the vulnerable file or process; etc.).

In some embodiments, the computer system modifies (646) at least a portion of the memory to prevent future attacks that comprise the same or similar activities as indicated by the forensic data (e.g., modify a file or process in the memory such that the modified file or process does not respond to unauthorized activities).

In some embodiments, modifying the at least a portion of the memory includes modifying at least one of the one or more programs to prevent future attacks that comprise the same or similar activities as indicated by the forensic data.

In some embodiments, the computer system is connected (648) to a set of computers. A respective computer in the set of computers has a respective set of one or more programs. The computer system modifies at least one program of the respective set of one or more programs in the respective computer to prevent the respective computer from future attacks. For example, the computer system sends the fingerprint to the IDS/IPS system 142 or a protected network device 136 to modify at least one program in the protected network device 136.

In some embodiments, the computer system continues (650) to execute at least a subset of the one or more programs.

Figure 7:
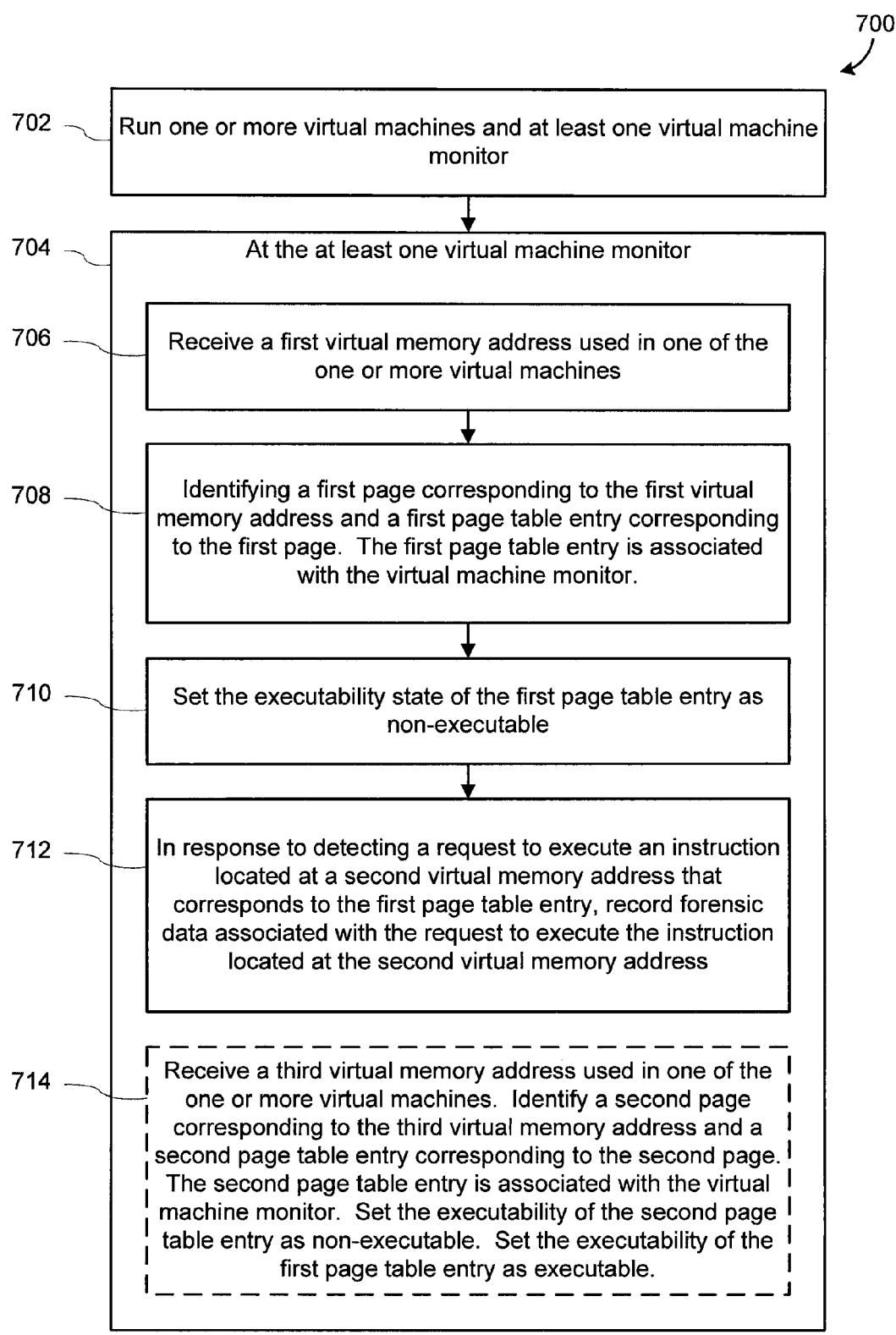
FIG. 7 is a flowchart representing a method of monitoring a computer system, in accordance with some embodiments.

FIG. 7 is a flowchart representing a method 700 of monitoring a computer system (e.g., the virtual machine 113-1 or a virtual machine in a protected network device 136), in accordance with some embodiments. The method 700 is performed at a computer system (e.g., the decoy network device 106 or the protected network device 136) having one or more processors and memory storing one or more programs for execution by the one or more processors.

The computer system runs (702) one or more virtual machines (e.g., the virtual machine 113-1 and the virtual machine 113-2 in FIG. 2) and at least one virtual machine monitor (e.g., the virtual machine monitor 214).

The following operations are performed (704) at the at least one virtual machine monitor.

The computer system receives (706) a first virtual memory address used in one of the one or more virtual machines. The computer system identifies (708) a first page corresponding to the first virtual memory address and a first page table entry corresponding to the first page. The first page table entry is associated with the virtual machine monitor. In some embodiments, the first page table entry is a shadow page table entry. In other embodiments, the first page table entry is an extended page table entry.

The computer system sets (710) the executability state of the first page table entry as non-executable.

For example, in FIG. 5A, the computer system receives a first virtual memory address used in the virtual machine 113, and walks through the shadow page table 522 to identify a shadow page table entry 316-S corresponding to the first virtual memory address and a corresponding page 318. The computer system sets the executability state of the shadow page table entry 316-S as non-executable.

In another example, in FIG. 5B, the computer system receives a first virtual memory address used in the virtual machine 113, and walks through the decoy OS page table 228 to identify a guest physical memory address. The computer system then walks through the extended page table 532 to identify an extended page table entry 316-E that corresponds to the first virtual memory address and a corresponding page 318. The computer system sets the executability state of the extended page table entry 316-E as non-executable.

The computer system, in response to detecting a request to execute an instruction located at a second virtual memory address that corresponds to the first page table entry, records (712) forensic data associated with the request to execute the instruction located at the second virtual memory address. (e.g., see the description of the operation 618).

In some embodiments, the at least one virtual machine monitor receives (714) a third virtual memory address used in one of the one or more virtual machines. The at least one virtual machine monitor identifies a second page corresponding to the third virtual memory address and a second page table entry corresponding to the second page. The second page table entry is associated with the virtual machine monitor. The computer system sets the executability state of the second page table entry as non-executable, and sets the executability state of the first page table entry as executable. For example, when a page previously set as non-executable does not need further monitoring, the computer system sets the executability state of a corresponding page table entry.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

For example, although some of the embodiments are described herein with respect to a decoy network device, persons having ordinary skill in the art would recognize that analogous methods and systems described herein can be used with protected network devices. In addition, although some of the embodiments are described herein with respect to monitoring unauthorized activities, persons having ordinary skill in the art would recognize that analogous methods and systems can be used for monitoring computer systems for other purposes (e.g., improved stability, development and debugging, and/or improved performance).

What is claimed is:

1. A computer implemented method of identifying unauthorized activities on a computer system, said computer system comprising: one or more processors; and memory segmented into multiple pages, said memory storing one or more programs for execution by the one or more processors, said method comprising:
    locating a list of target addresses;
    while executing at least one of the one or more programs:
    in response to detecting a request to execute an instruction located at a first address of a first page:
        locating a first page table entry corresponding to the first page, the first page table entry having a first executability state; and
        determining the first executability state; when the first executability state is non-executable,
        identifying a first set of one or more target addresses in the list of target addresses that correspond to the first page;
        identifying a second set of one or more target addresses in the list that correspond to one or more pages other than the first page;
        storing one or more target addresses of the first set of target addresses in breakpoint registers of the computer system, each breakpoint register configured to store an address of a respective breakpoint in the memory;
        setting the first executability state of the first page table entry as executable; and
        setting the executability states of page table entries that correspond to the second set of target addresses as non-executable; and when the first address corresponds to one of the target addresses stored in the breakpoint registers, recording forensic data associated with the request to execute the instruction located at the first address.

2. The method of claim 1, further comprising preventing future attacks that comprise the same or similar activities as indicated by the forensic data.

3. The method of claim 1, further comprising modifying at least a portion of the memory to prevent future attacks that comprise the same or similar activities as indicated by the forensic data.

4. The method of claim 1, wherein the computer system is connected to a set of computers; and a respective computer in the set of computers has a respective set of one or more programs, the method further comprising modifying at least one program of the respective set of one or more programs in the respective computer to prevent the respective computer from future attacks.

5. The method of claim 1, wherein at least one of the one or more processors is configured to generate an interrupt in response to detecting a request to execute an instruction located at an address stored in at least one of the breakpoint registers; and
the method further comprising: determining that the first address corresponds to one of the target addresses stored in the breakpoint registers in accordance with the interrupt.

6. The method of claim 1, wherein:
the one or more programs include at least one virtual machine monitor and at least one virtual machine, a respective virtual machine of the at least one virtual machine having a respective decoy operating system;
the method is performed in the at least one virtual machine monitor; and
the target addresses correspond to addresses in the respective decoy operating system in the respective virtual machine.

7. The method of claim 1, wherein the breakpoint registers include debug registers.

8. The method of claim 1, wherein the page table entries include page table entries in one or more shadow page tables.

9. The method of claim 1, wherein the page table entries include page table entries in one or more extended page tables.

10. The method of claim 1, wherein setting the executability states of page table entries that correspond to the second set of target addresses as non-executable includes: for a respective target address in the second set of target addresses, identifying a respective page table entry corresponding to the respective target address.

11. The method of claim 1, further comprising:
after setting the first executability state of the first page table entry as executable and setting the executability states of page table entries that correspond to the second set of target addresses as non-executable, continuing to execute the at least one of the one or more programs.

12. The method of claim 1, further comprising continuing to execute at least a subset of the one or more programs.

13. A computer implemented method of identifying unauthorized activities on a computer system, said computer system comprising: one or more processors; and memory segmented into multiple pages, said memory storing one or more programs for execution by the one or more processors, said method comprising:
locating a list of target addresses;
while executing at least one of the one or more programs:
in response to detecting a request to execute an instruction located at a first address of a first page:
locating a first page table entry corresponding to the first page, the first page table entry having a first executability state; and
determining the first executability state;
when the first executability state is non-executable:
identifying a first set of one or more target addresses in the list of target addresses that correspond to the first page;
identifying a second set of one or more target addresses in the list that correspond to one or more pages other than the first page;
storing one or more target addresses of the first set of target addresses in breakpoint registers of the computer system, each breakpoint register configured to store an address of a respective breakpoint in the memory, including:
determining whether a number of addresses in the first set of target addresses exceeds a number of the breakpoint registers;
when the number of addresses in the first set of target addresses exceeds the number of the breakpoint registers:
selecting a subset of target addresses from the first set of target addresses in accordance with predefined criteria, the predefined criteria comprising at least the number of the breakpoint registers; and
storing the subset of target addresses in the breakpoint registers; and,
when the number of addresses in the first set of target addresses does not exceed the number of the breakpoint registers, storing the first set of target addresses in the breakpoint registers;
setting the first executability state of the first page table entry as executable; and
setting the executability states of page table entries that correspond to the second set of target addresses as non-executable; and
when the first address corresponds to one of the target addresses stored in the breakpoint registers, recording forensic data associated with the request to execute the instruction located at the first address.

14. The method of claim 13, further comprising, when the number of addresses in the first set of target addresses does not exceed the number of the breakpoint registers, repeating to store one or more target addresses in the first set of target addresses to the breakpoint registers such that each breakpoint register stores one of the first set of target addresses.

15. A computer system, comprising:
one or more processors;
memory segmented into multiple pages, said memory storing:
one or more programs for execution by the one or more processors;
at least one page table comprising multiple page table entries, each page table entry (i) comprising an executability state, and (ii) corresponding to a respective page of the multiple pages; and
a list of target addresses; and
one or more breakpoint registers, each configured to store an address of a respective breakpoint in the memory,
wherein the one or more programs include instructions for:
while executing the at least one program:
in response to detecting a request to execute an instruction located at a first address of a first page:

locating a first page table entry associated with the first address; and determining a first executability state of the first page table entry; when the first executability state is non-executable:

identifying a first set of one or more target addresses in the list of target addresses that correspond to the first page;

identifying a second set of one or more target addresses in the list that correspond to one or more pages other than the first page;

storing at least some of the first set of target addresses in the breakpoint registers;

setting the first executability state of the first page table entry as executable; and setting the executability states of page table entries that correspond to the second set of target addresses as non-executable; and when the first address corresponds to one of the target addresses stored in the breakpoint registers, recording forensic data associated with the request to execute an instruction located at the first address.

16. A non-transitory computer readable storage medium storing one or more programs for execution by one or more processors of a computer system having memory segmented into multiple pages, the one or more programs comprising instructions for:

receiving a list of target addresses;

while executing at least one of the one or more programs:

in response to detecting a request to execute an instruction located at a first address of a first page:

locating a first page table entry corresponding to the first page, the first page table entry having a first executability state; and determining the first executability state;

when the first executability state is non-executable:

identifying a first set of one or more target addresses in the list of target addresses that correspond to the first page;

identifying a second set of one or more target addresses in the list that correspond to one or more pages other than the first page;

storing one or more target addresses of the first set of target addresses in breakpoint registers of the computer system, each breakpoint register configured to store an address of a respective breakpoint in the memory;

setting the first executability state of the first page table entry as executable; and setting the executability states of page table entries that correspond to the second set of target addresses as non-executable; and when the first address corresponds to one of the target addresses stored in the breakpoint registers, recording forensic data associated with the request to execute an instruction located at the first address.

17. A computer implemented method of sampling data for identifying unauthorized activities on a computer system, the computer system having one or more processors; and memory segmented into multiple pages, said memory storing one or more programs, the method comprising:

running one or more virtual machines and at least one virtual machine monitor; and at the at least one virtual machine monitor:

receiving a first virtual memory address used in one of the one or more virtual machines;

identifying a first page corresponding to the first virtual memory address and a first page table entry corresponding to the first page, the first page table entry having an executability state and being associated with the virtual machine monitor;

setting the executability state of the first page table entry as non-executable; and in response to detecting a request to execute an instruction located at a second virtual memory address that corresponds to the first page table entry, recording forensic data associated with the request to execute the instruction located at the second virtual memory address.

18. The method of claim 17, further comprising:

at the at least one virtual machine monitor:

receiving a third virtual memory address used in one of the one or more virtual machines;

identifying a second page corresponding to the third virtual memory address and a second page table entry corresponding to the second page, the second page table entry being associated with the virtual machine monitor;

setting the executability state of the second page table entry as non-executable; and setting the executability state of the first page table entry as executable.

19. A computer system, comprising:

one or more processors; and memory segmented into multiple pages, said memory storing:

one or more virtual machines;

a virtual machine monitor running the one or more virtual machines; and at least one page table comprising multiple page table entries, each page table entry (i) comprising an executability state, and (ii) corresponding to a respective page of the multiple pages; and one or more programs comprising instructions for: at the at least one virtual machine monitor:

receiving a first virtual memory address used in one of the one or more virtual machines;

identifying a first page table entry corresponding to the first virtual memory address, the first page table entry having an executability state and being associated with the virtual machine monitor;

setting the executability state of the first page table entry as non-executable;

in response to detecting a request to execute an instruction located at a second virtual memory address that corresponds to the first page table entry, recording forensic data associated with the request to execute the instruction located at the second virtual memory address.

20. A non-transitory computer readable storage medium storing one or more programs for execution by one or more processors of a computer system having memory segmented into multiple pages, the one or more programs comprising instructions for:

running one or more virtual machines and at least one virtual machine monitor; and at the at least one virtual machine monitor:

receiving a first virtual memory address used in one of the one or more virtual machines;

identifying a first page corresponding to the first virtual memory address and a first page table entry corresponding to the first page, the first page table entry having an executability state and being associated with the virtual machine monitor;

setting the executability state of the first page table entry as non-executable;

in response to detecting a request to execute an instruction located at a second virtual memory address that corresponds to the first page table entry, recording forensic data associated with the request to execute the instruction located at the second virtual memory address.

* * * * *